(12) United States Patent
Mahoney

(10) Patent No.: US 12,533,073 B2
(45) Date of Patent: Jan. 27, 2026

(54) SYSTEMS AND METHODS FOR TESTING OF MULTISENSORY INTEGRATION EFFECTS

(71) Applicant: Albert Einstein College of Medicine, Bronx, NY (US)

(72) Inventor: Jeannette Rose Mahoney, Stony Point, NY (US)

(73) Assignee: ALBERT EINSTEIN COLLEGE OF MEDICINE, Bronx, NY (US)

( * ) Notice: Subject to any disclaimer, the term of this patent is extended or adjusted under 35 U.S.C. 154(b) by 1227 days.

(21) Appl. No.: 17/038,974

(22) Filed: Sep. 30, 2020

(65) Prior Publication Data

US 2021/0153800 A1 May 27, 2021

Related U.S. Application Data

(60) Provisional application No. 62/908,180, filed on Sep. 30, 2019.

(51) Int. Cl.
*A61B 5/00* (2006.01)
*A61B 5/16* (2006.01)

(52) U.S. Cl.
CPC .......... *A61B 5/4005* (2013.01); *A61B 5/0051* (2013.01); *A61B 5/162* (2013.01)

(58) Field of Classification Search
CPC ...... A61B 5/4005; A61B 5/0051; A61B 5/162
See application file for complete search history.

(56) References Cited

U.S. PATENT DOCUMENTS

| | | | | |
|---|---|---|---|---|
| 9,663,118 | B1* | 5/2017 | Palmer | B60W 60/007 |
| 2005/0130249 | A1* | 6/2005 | Parris | A61B 5/14514 |
| | | | | 435/14 |
| 2010/0292560 | A1* | 11/2010 | Wyrwicz | A61B 5/055 |
| | | | | 600/410 |
| 2011/0065075 | A1* | 3/2011 | Duffy | G09B 7/00 |
| | | | | 600/595 |
| 2016/0220162 | A1* | 8/2016 | Mantysalo | A61B 5/7445 |
| 2017/0021837 | A1* | 1/2017 | Ebina | B60K 35/81 |

(Continued)

*Primary Examiner* — Eugene L Kim
*Assistant Examiner* — Christopher Glenn
(74) *Attorney, Agent, or Firm* — Karen A. LeCuyer; DeWitt LLP

(57) ABSTRACT

Methods, computer program products, and systems for testing of multisensory integration of a user are provided as well as their association with cognitive and motor outcomes. In various embodiments, the method includes providing a first plurality of signals to the user from a first signaling modality. A second plurality of signals are provided to the user from a second signaling modality. Indications are received at a response sensor from the user in response to each of the first and second plurality of signals. Reaction times between each of the first and second plurality of signals and the respective indication are determined. An observed curve is generated based on the reaction times. A differential curve is determined from the observed curve and a predicted curve. An area under at least a portion of the differential curve is determined. When the area is above a predetermined threshold, an indication that the user has satisfactory integrated sensory information is provided. When the area is below the predetermined threshold, an indication that the user has unsatisfactory integrated sensory information is provided.

19 Claims, 34 Drawing Sheets

(56) References Cited

U.S. PATENT DOCUMENTS

2017/0351958 A1* 12/2017 Ghosh ................. A61B 5/7275
2018/0296084 A1* 10/2018 Kawahara ............. A61B 3/024
2019/0261908 A1*  8/2019 Alailima ................ G09B 7/02

* cited by examiner

Equation Formula = FREQUENCY(B5:B49,V3:V24/R4)

| 1...3 | A | B | C | D |
|---|---|---|---|---|
| 4 | trials | V | S | VS |
| 5 | 1 | 243 | inf | inf |
| 6 | 2 | 249 | inf | inf |
| 7 | 3 | 252 | 272 | 237 |
| 8 | 4 | 256 | 274 | 237 |
| 9 | 5 | 275 | 280 | 246 |
| 10 | 6 | 283 | 281 | 252 |
| 11 | 7 | 286 | 299 | 252 |
| 12 | 8 | 287 | 305 | 257 |
| 13 | 9 | 288 | 309 | 259 |
| 14 | 10 | 288 | 312 | 261 |
| 15 | 11 | 289 | 315 | 263 |
| 16 | 12 | 291 | 317 | 270 |
| 17 | 13 | 291 | 318 | 270 |
| 18 | 14 | 297 | 319 | 272 |
| 19 | 15 | 299 | 323 | 280 |
| 20 | 16 | 300 | 326 | 285 |
| 21 | 17 | 300 | 328 | 290 |
| 22 | 18 | 301 | 329 | 294 |
| 23 | 19 | 305 | 331 | 296 |
| 24 | 20 | 306 | 334 | 298 |
| 25 | 21 | 308 | 336 | 298 |
| 26 | 22 | 315 | 340 | 305 |
| 27 | 23 | 381 | 343 | 308 |
| 28 | 24 | 319 | 345 | 309 |
| 29 | 25 | 320 | 346 | 311 |
| 30 | 26 | 322 | 353 | 314 |
| 31 | 27 | 332 | 356 | 314 |
| 32 | 28 | 336 | 359 | 317 |
| 33 | 29 | 337 | 378 | 318 |
| 34 | 30 | 338 | 387 | 325 |
| 35 | 31 | 339 | 391 | 331 |
| 36 | 32 | 340 | 419 | 331 |
| 37 | 33 | 355 | 429 | 338 |
| 38 | 34 | 357 | 462 | 338 |
| 39 | 35 | 358 | 471 | 342 |
| 40 | 36 | 371 | 514 | 351 |
| 41 | 37 | 403 | 526 | 370 |
| 42 | 38 | 415 | 582 | 380 |
| 43 | 39 | 448 | 606 | 394 |
| 44 | 40 | 460 | 616 | 396 |
| 45 | 41 | 471 | 712 | 403 |
| 46 | 42 | 479 | 716 | 405 |
| 47 | 43 | 645 | 740 | 502 |
| 48 | 44 | 646 | inf | 555 |
| 49 | 45 | inf | inf | 601 |

| E...J | K | L | M | N | O | P | Q | R | S |
|---|---|---|---|---|---|---|---|---|---|
| 1...3 | | mean | stdev | sem | median | min | max | N | range |
| 4 | Vis | 341.32 | 88.01 | 13.12 | 316.5 | 243 | 646 | 45.00 | |
| 5 | Soma | 397.54 | 127.61 | 19.02 | 343 | 272 | 740 | 45.00 | |
| 6 | VS | 325 | 78.21 | 11.66 | 309 | 237 | 601 | 45.00 | |
| 7 | ALL | | | | | 237 | 740 | | 503 |

| | U | V | W | X | Y | Z | AA |
|---|---|---|---|---|---|---|---|
| 1 | Quantiles | | | Probability | | | |
| 2 | | ALL | | | Vis | Soma | VS |
| 3 | 0.00 | 237 | | 0.00 | Eqn | 0 | 0.04 |
| 4 | 0.01 | 242.03 | | 0.01 | 0.00 | 0.00 | 0.00 |
| 5 | 0.05 | 262.15 | | 0.05 | 0.09 | 0.00 | 0.13 |
| 6 | 0.10 | 287.3 | | 0.10 | 0.09 | 0.09 | 0.13 |
| 7 | 0.15 | 312.45 | | 0.15 | 0.29 | 0.09 | 0.20 |
| 8 | 0.20 | 337.6 | | 0.20 | 0.18 | 0.24 | 0.16 |
| 9 | 0.25 | 362.75 | | 0.25 | 0.13 | 0.16 | 0.09 |
| 10 | 0.30 | 387.9 | | 0.30 | 0.02 | 0.04 | 0.04 |
| 11 | 0.35 | 413.05 | | 0.35 | 0.02 | 0.02 | 0.09 |
| 12 | 0.40 | 438.2 | | 0.40 | 0.02 | 0.04 | 0.00 |
| 13 | 0.45 | 463.35 | | 0.45 | 0.04 | 0.02 | 0.00 |
| 14 | 0.50 | 488.5 | | 0.50 | 0.04 | 0.02 | 0.00 |
| 15 | 0.55 | 513.65 | | 0.55 | 0.00 | 0.00 | 0.02 |
| 16 | 0.60 | 538.8 | | 0.60 | 0.00 | 0.04 | 0.00 |
| 17 | 0.65 | 563.95 | | 0.65 | 0.00 | 0.00 | 0.02 |
| 18 | 0.70 | 589.1 | | 0.70 | 0.00 | 0.02 | 0.00 |
| 19 | 0.75 | 614.25 | | 0.75 | 0.00 | 0.02 | 0.02 |
| 20 | 0.80 | 639.4 | | 0.80 | 0.00 | 0.02 | 0.00 |
| 21 | 0.85 | 664.55 | | 0.85 | 0.04 | 0.00 | 0.00 |
| 22 | 0.90 | 689.7 | | 0.90 | 0.00 | 0.00 | 0.00 |
| 23 | 0.95 | 714.85 | | 0.95 | 0.00 | 0.02 | 0.00 |
| 24 | 1.00 | 740 | | 1.00 | 0.00 | 0.04 | 0.00 |

FIG. 3A

Equation Formula = FREQUENCY(C5:C49,V3:V24/R5)

| 1...3 | A | B | C | D |
|---|---|---|---|---|
| 4 | trials | V | S | VS |
| 5 | 1 | 243 | inf | inf |
| 6 | 2 | 249 | inf | inf |
| 7 | 3 | 252 | 272 | 237 |
| 8 | 4 | 256 | 274 | 237 |
| 9 | 5 | 275 | 280 | 246 |
| 10 | 6 | 283 | 281 | 252 |
| 11 | 7 | 286 | 299 | 252 |
| 12 | 8 | 287 | 305 | 257 |
| 13 | 9 | 288 | 309 | 259 |
| 14 | 10 | 288 | 312 | 261 |
| 15 | 11 | 289 | 315 | 263 |
| 16 | 12 | 291 | 317 | 270 |
| 17 | 13 | 291 | 318 | 270 |
| 18 | 14 | 297 | 319 | 272 |
| 19 | 15 | 299 | 323 | 280 |
| 20 | 16 | 300 | 326 | 285 |
| 21 | 17 | 300 | 328 | 290 |
| 22 | 18 | 301 | 329 | 294 |
| 23 | 19 | 305 | 331 | 296 |
| 24 | 20 | 306 | 334 | 298 |
| 25 | 21 | 308 | 336 | 298 |
| 26 | 22 | 315 | 340 | 305 |
| 27 | 23 | 381 | 343 | 308 |
| 28 | 24 | 319 | 345 | 309 |
| 29 | 25 | 320 | 346 | 311 |
| 30 | 26 | 322 | 353 | 314 |
| 31 | 27 | 332 | 356 | 314 |
| 32 | 28 | 336 | 359 | 317 |
| 33 | 29 | 337 | 378 | 318 |
| 34 | 30 | 338 | 387 | 325 |
| 35 | 31 | 339 | 391 | 331 |
| 36 | 32 | 340 | 419 | 331 |
| 37 | 33 | 355 | 429 | 338 |
| 38 | 34 | 357 | 462 | 338 |
| 39 | 35 | 358 | 471 | 342 |
| 40 | 36 | 371 | 514 | 351 |
| 41 | 37 | 403 | 526 | 370 |
| 42 | 38 | 415 | 582 | 380 |
| 43 | 39 | 448 | 606 | 394 |
| 44 | 40 | 460 | 616 | 396 |
| 45 | 41 | 471 | 712 | 403 |
| 46 | 42 | 479 | 716 | 405 |
| 47 | 43 | 645 | 740 | 502 |
| 48 | 44 | 646 | inf | 555 |
| 49 | 45 | inf | inf | 601 |

| E...J | K | L | M | N | O | P | Q | R | S |
|---|---|---|---|---|---|---|---|---|---|
| 1...3 | | mean | stdev | sem | median | min | max | N | range |
| 4 | Vis | 341.32 | 88.01 | 13.12 | 316.5 | 243 | 646 | 45.00 | |
| 5 | Soma | 397.54 | 127.61 | 19.02 | 343 | 272 | 740 | 45.00 | |
| 6 | VS | 325 | 78.21 | 11.66 | 309 | 237 | 601 | 45.00 | |
| 7 | ALL | | | | | 237 | 740 | | 503 |

| | U | V | W | X | Y | Z | AA |
|---|---|---|---|---|---|---|---|
| 1 | Quantiles | | | | Probability | | |
| 2 | | ALL | | | | Vis | Soma | VS |
| 3 | 0.00 | 237 | | | 0.00 | 0.00 | Eqn | 0.04 |
| 4 | 0.01 | 242.03 | | | 0.01 | 0.00 | 0.00 | 0.00 |
| 5 | 0.05 | 262.15 | | | 0.05 | 0.09 | 0.00 | 0.13 |
| 6 | 0.10 | 287.3 | | | 0.10 | 0.09 | 0.09 | 0.13 |
| 7 | 0.15 | 312.45 | | | 0.15 | 0.29 | 0.09 | 0.20 |
| 8 | 0.20 | 337.6 | | | 0.20 | 0.18 | 0.24 | 0.16 |
| 9 | 0.25 | 362.75 | | | 0.25 | 0.13 | 0.16 | 0.09 |
| 10 | 0.30 | 387.9 | | | 0.30 | 0.02 | 0.04 | 0.04 |
| 11 | 0.35 | 413.05 | | | 0.35 | 0.02 | 0.02 | 0.09 |
| 12 | 0.40 | 438.2 | | | 0.40 | 0.02 | 0.04 | 0.00 |
| 13 | 0.45 | 463.35 | | | 0.45 | 0.04 | 0.02 | 0.00 |
| 14 | 0.50 | 488.5 | | | 0.50 | 0.04 | 0.02 | 0.00 |
| 15 | 0.55 | 513.65 | | | 0.55 | 0.00 | 0.00 | 0.02 |
| 16 | 0.60 | 538.8 | | | 0.60 | 0.00 | 0.04 | 0.00 |
| 17 | 0.65 | 563.95 | | | 0.65 | 0.00 | 0.00 | 0.02 |
| 18 | 0.70 | 589.1 | | | 0.70 | 0.00 | 0.02 | 0.00 |
| 19 | 0.75 | 614.25 | | | 0.75 | 0.00 | 0.02 | 0.02 |
| 20 | 0.80 | 639.4 | | | 0.80 | 0.00 | 0.02 | 0.00 |
| 21 | 0.85 | 664.55 | | | 0.85 | 0.04 | 0.00 | 0.00 |
| 22 | 0.90 | 689.7 | | | 0.90 | 0.00 | 0.00 | 0.00 |
| 23 | 0.95 | 714.85 | | | 0.95 | 0.00 | 0.02 | 0.00 |
| 24 | 1.00 | 740 | | | 1.00 | 0.00 | 0.04 | 0.00 |

FIG. 3B

Equation Formula = FREQUENCY(D5:D49,V3:V24/R6)

| 1...3 | A | B | C | D |
|---|---|---|---|---|
| 4 | trials | V | S | VS |
| 5 | 1 | 243 | inf | inf |
| 6 | 2 | 249 | inf | inf |
| 7 | 3 | 252 | 272 | 237 |
| 8 | 4 | 256 | 274 | 237 |
| 9 | 5 | 275 | 280 | 246 |
| 10 | 6 | 283 | 281 | 252 |
| 11 | 7 | 286 | 299 | 252 |
| 12 | 8 | 287 | 305 | 257 |
| 13 | 9 | 288 | 309 | 259 |
| 14 | 10 | 288 | 312 | 261 |
| 15 | 11 | 289 | 315 | 263 |
| 16 | 12 | 291 | 317 | 270 |
| 17 | 13 | 291 | 318 | 270 |
| 18 | 14 | 297 | 319 | 272 |
| 19 | 15 | 299 | 323 | 280 |
| 20 | 16 | 300 | 326 | 285 |
| 21 | 17 | 300 | 328 | 290 |
| 22 | 18 | 301 | 329 | 294 |
| 23 | 19 | 305 | 331 | 296 |
| 24 | 20 | 306 | 334 | 298 |
| 25 | 21 | 308 | 336 | 298 |
| 26 | 22 | 315 | 340 | 305 |
| 27 | 23 | 381 | 343 | 308 |
| 28 | 24 | 319 | 345 | 309 |
| 29 | 25 | 320 | 346 | 311 |
| 30 | 26 | 322 | 353 | 314 |
| 31 | 27 | 332 | 356 | 314 |
| 32 | 28 | 336 | 359 | 317 |
| 33 | 29 | 337 | 378 | 318 |
| 34 | 30 | 338 | 387 | 325 |
| 35 | 31 | 339 | 391 | 331 |
| 36 | 32 | 340 | 419 | 331 |
| 37 | 33 | 355 | 429 | 338 |
| 38 | 34 | 357 | 462 | 338 |
| 39 | 35 | 358 | 471 | 342 |
| 40 | 36 | 371 | 514 | 351 |
| 41 | 37 | 403 | 526 | 370 |
| 42 | 38 | 415 | 582 | 380 |
| 43 | 39 | 448 | 606 | 394 |
| 44 | 40 | 460 | 616 | 396 |
| 45 | 41 | 471 | 712 | 403 |
| 46 | 42 | 479 | 716 | 405 |
| 47 | 43 | 645 | 740 | 502 |
| 48 | 44 | 646 | inf | 555 |
| 49 | 45 | inf | inf | 601 |

| E...J | K | L | M | N | O | P | Q | R | S |
|---|---|---|---|---|---|---|---|---|---|
| 1...3 | | mean | stdev | sem | median | min | max | N | range |
| 4 | Vis | 341.32 | 88.01 | 13.12 | 316.5 | 243 | 646 | 45.00 | |
| 5 | Soma | 397.54 | 127.61 | 19.02 | 343 | 272 | 740 | 45.00 | |
| 6 | VS | 325 | 78.21 | 11.66 | 309 | 237 | 601 | 45.00 | |
| 7 | ALL | | | | | 237 | 740 | | 503 |

| | U | V | W | X | Y | Z | AA |
|---|---|---|---|---|---|---|---|
| 1 | Quantiles | | | Probability | | | |
| 2 | | ALL | | | | Vis | Soma | VS |
| 3 | 0.00 | 237 | | 0.00 | 0.00 | 0.00 | Eqn |
| 4 | 0.01 | 242.03 | | 0.01 | 0.00 | 0.00 | 0.00 |
| 5 | 0.05 | 262.15 | | 0.05 | 0.09 | 0.00 | 0.13 |
| 6 | 0.10 | 287.3 | | 0.10 | 0.09 | 0.09 | 0.13 |
| 7 | 0.15 | 312.45 | | 0.15 | 0.29 | 0.09 | 0.20 |
| 8 | 0.20 | 337.6 | | 0.20 | 0.18 | 0.24 | 0.16 |
| 9 | 0.25 | 362.75 | | 0.25 | 0.13 | 0.16 | 0.09 |
| 10 | 0.30 | 387.9 | | 0.30 | 0.02 | 0.04 | 0.04 |
| 11 | 0.35 | 413.05 | | 0.35 | 0.02 | 0.02 | 0.09 |
| 12 | 0.40 | 438.2 | | 0.40 | 0.02 | 0.04 | 0.00 |
| 13 | 0.45 | 463.35 | | 0.45 | 0.04 | 0.02 | 0.00 |
| 14 | 0.50 | 488.5 | | 0.50 | 0.04 | 0.02 | 0.00 |
| 15 | 0.55 | 513.65 | | 0.55 | 0.00 | 0.00 | 0.02 |
| 16 | 0.60 | 538.8 | | 0.60 | 0.00 | 0.04 | 0.00 |
| 17 | 0.65 | 563.95 | | 0.65 | 0.00 | 0.00 | 0.02 |
| 18 | 0.70 | 589.1 | | 0.70 | 0.00 | 0.02 | 0.00 |
| 19 | 0.75 | 614.25 | | 0.75 | 0.00 | 0.02 | 0.02 |
| 20 | 0.80 | 639.4 | | 0.80 | 0.00 | 0.02 | 0.00 |
| 21 | 0.85 | 664.55 | | 0.85 | 0.04 | 0.00 | 0.00 |
| 22 | 0.90 | 689.7 | | 0.90 | 0.00 | 0.00 | 0.00 |
| 23 | 0.95 | 714.85 | | 0.95 | 0.00 | 0.02 | 0.00 |
| 24 | 1.00 | 740 | | 1.00 | 0.00 | 0.04 | 0.00 |

FIG. 3C

Equation Formula = SUM(Z3:Z23)

| | X | Y | Z | AA | AB | AC | AD | AE | AF |
|---|---|---|---|---|---|---|---|---|---|
| | Probability | | | | | Cumlative Probability | | | |
| | | | Vis | Soma | VS | | | Vis | Soma | VS (actual) |
| 3 | 0.00 | R4 | 0 | 0.04 | | 0.00 | 0 | 0 | 0.04 |
| 4 | 0.01 | 0.00 | 0.00 | 0.00 | | 0.01 | 0.09 | 0.00 | 0.18 |
| 5 | 0.05 | 0.09 | 0.00 | 0.13 | | 0.05 | 0.18 | 0.09 | 0.31 |
| 6 | 0.10 | 0.09 | 0.09 | 0.13 | | 0.10 | 0.47 | 0.18 | 0.51 |
| 7 | 0.15 | 0.29 | 0.09 | 0.20 | | 0.15 | 0.64 | 0.42 | 0.67 |
| 8 | 0.20 | 0.18 | 0.24 | 0.16 | | 0.20 | 0.78 | 0.58 | 0.76 |
| 9 | 0.25 | 0.13 | 0.16 | 0.09 | | 0.25 | 0.80 | 0.62 | 0.80 |
| 10 | 0.30 | 0.02 | 0.04 | 0.04 | | 0.30 | 0.82 | 0.64 | 0.89 |
| 11 | 0.35 | 0.02 | 0.02 | 0.09 | | 0.35 | 0.84 | 0.69 | 0.89 |
| 12 | 0.40 | 0.02 | 0.04 | 0.00 | | 0.40 | 0.89 | 0.71 | 0.89 |
| 13 | 0.45 | 0.04 | 0.02 | 0.00 | | 0.45 | 0.93 | 0.73 | 0.89 |
| 14 | 0.50 | 0.04 | 0.02 | 0.00 | | 0.50 | 0.93 | 0.73 | 0.89 |
| 15 | 0.55 | 0.00 | 0.00 | 0.02 | | 0.55 | 0.93 | 0.78 | 0.91 |
| 16 | 0.60 | 0.00 | 0.04 | 0.00 | | 0.60 | 0.93 | 0.78 | 0.91 |
| 17 | 0.65 | 0.00 | 0.00 | 0.02 | | 0.65 | 0.93 | 0.80 | 0.93 |
| 18 | 0.70 | 0.00 | 0.02 | 0.00 | | 0.70 | 0.93 | 0.82 | 0.93 |
| 19 | 0.75 | 0.00 | 0.02 | 0.02 | | 0.75 | 0.93 | 0.84 | 0.96 |
| 20 | 0.80 | 0.00 | 0.02 | 0.00 | | 0.80 | 0.93 | 0.84 | 0.96 |
| 21 | 0.85 | 0.04 | 0.00 | 0.00 | | 0.85 | 0.98 | 0.84 | 0.96 |
| 22 | 0.90 | 0.00 | 0.00 | 0.00 | | 0.90 | 0.98 | 0.84 | 0.96 |
| 23 | 0.95 | 0.00 | 0.02 | 0.00 | | 0.95 | 0.98 | Eqn | 0.96 |
| 24 | 1.00 | 0.00 | 0.04 | 0.00 | | 1.00 | 0.98 | 0.91 | 0.96 |

| | T | U | V | W | X | Y | | Z | AA | AB | AC | AD | AE | AF | AG | AH |
|---|---|---|---|---|---|---|---|---|---|---|---|---|---|---|---|---|
| | | Quantiles | | | | Probability | | | | | | Cumulative Probability | | | | |
| | | | ALL | | | Vis | Soma | VS | | | Vis | Soma | VS (actual) | predicted | Difference |
| | | 0.00 | 237.00 | | 0.00 | 0.00 | 0.00 | 0.04 | | 0.00 | 0.00 | 0.00 | 0.04 | 0.00 | 0.04 |
| | | 0.01 | 242.03 | | 0.01 | 0.00 | 0.00 | 0.00 | | 0.05 | 0.09 | 0.00 | 0.18 | 0.09 | 0.09 |
| | | 0.05 | 262.15 | | 0.05 | 0.09 | 0.00 | 0.13 | | 0.10 | 0.18 | 0.09 | 0.31 | 0.27 | 0.04 |
| | | 0.10 | 287.30 | | 0.10 | 0.09 | 0.09 | 0.13 | | 0.15 | 0.47 | 0.18 | 0.51 | 0.64 | -0.13 |
| | | 0.15 | 312.45 | | 0.15 | 0.29 | 0.09 | 0.20 | | 0.20 | 0.64 | 0.42 | 0.67 | 1.00 | -0.33 |
| | | 0.20 | 337.60 | | 0.20 | 0.18 | 0.24 | 0.16 | | 0.25 | 0.78 | 0.58 | 0.76 | 1.00 | -0.24 |
| | | 0.25 | 362.75 | | 0.25 | 0.13 | 0.16 | 0.09 | | 0.30 | 0.80 | 0.62 | 0.80 | 1.00 | -0.20 |
| | | 0.30 | 387.90 | | 0.30 | 0.02 | 0.04 | 0.04 | | 0.35 | 0.82 | 0.64 | 0.89 | 1.00 | -0.11 |
| | | 0.35 | 413.05 | | 0.35 | 0.02 | 0.02 | 0.09 | | 0.40 | 0.84 | 0.69 | 0.89 | 1.00 | -0.11 |
| | | 0.40 | 438.20 | | 0.40 | 0.02 | 0.04 | 0.00 | | 0.45 | 0.89 | 0.71 | 0.89 | 1.00 | -0.11 |
| | | 0.45 | 463.35 | | 0.45 | 0.04 | 0.02 | 0.02 | | 0.50 | 0.93 | 0.73 | 0.91 | 1.00 | -0.09 |
| | | 0.50 | 488.50 | | 0.50 | 0.00 | 0.04 | 0.02 | | 0.55 | 0.93 | 0.78 | 0.91 | 1.00 | -0.09 |
| | | 0.55 | 513.65 | | 0.55 | 0.00 | 0.02 | 0.02 | | 0.60 | 0.93 | 0.78 | 0.93 | 1.00 | -0.07 |
| | | 0.60 | 538.80 | | 0.60 | 0.00 | 0.02 | 0.00 | | 0.65 | 0.93 | 0.80 | 0.93 | 1.00 | -0.07 |
| | | 0.65 | 563.95 | | 0.65 | 0.00 | 0.02 | 0.02 | | 0.70 | 0.93 | 0.82 | 0.96 | 1.00 | -0.04 |
| | | 0.70 | 589.10 | | 0.70 | 0.04 | 0.02 | 0.00 | | 0.75 | 0.98 | 0.84 | 0.96 | 1.00 | -0.04 |
| | | 0.75 | 614.25 | | 0.75 | 0.00 | 0.00 | 0.00 | | 0.80 | 0.98 | 0.84 | 0.96 | 1.00 | -0.04 |
| | | 0.80 | 639.40 | | 0.80 | 0.00 | 0.02 | 0.00 | | 0.85 | 0.98 | 0.87 | 0.96 | 1.00 | -0.04 |
| | | 0.85 | 664.55 | | 0.85 | 0.04 | 0.00 | 0.00 | | 0.90 | 0.98 | 0.91 | 0.96 | 1.00 | -0.04 |
| | | 0.90 | 689.70 | | 0.90 | 0.00 | 0.02 | 0.00 | | 0.95 | | | | | |
| | | 0.95 | 714.85 | | 0.95 | 0.00 | 0.02 | 0.00 | | 1.00 | | | | | |
| | | 1.00 | 740.00 | | 1.00 | 0.00 | 0.04 | 0.00 | | | | | | | |

| Quantiles | | | Probability | | | | | Cumulative Probability | | | | |
|---|---|---|---|---|---|---|---|---|---|---|---|---|
| U | V | W | X | Y | Z | AA | AB | AC | AD | AE | AF | AG | AH |
| Quantiles | ALL | | | Vis | Soma | VS | | | Vis | Soma | VS (actual) | predicted | difference |
| 0.00 | 237.00 | | 0.00 | 0.00 | 0.00 | 0.04 | | 0.00 | 0.00 | 0.00 | 0.04 | 0.00 | 0.04 |
| 0.01 | 242.03 | | 0.01 | 0.00 | 0.00 | 0.00 | | 0.05 | 0.09 | 0.09 | 0.18 | 0.09 | 0.09 |
| 0.05 | 262.15 | | 0.05 | 0.09 | 0.09 | 0.13 | | 0.10 | 0.18 | 0.09 | 0.31 | 0.27 | 0.04 |
| 0.10 | 287.30 | | 0.10 | 0.09 | 0.09 | 0.13 | | 0.15 | 0.47 | 0.18 | 0.51 | 0.64 | -0.13 |
| 0.15 | 312.45 | | 0.15 | 0.29 | 0.09 | 0.20 | | 0.20 | 0.64 | 0.42 | 0.67 | 1.00 | -0.33 |
| 0.20 | 337.60 | | 0.20 | 0.18 | 0.24 | 0.16 | | 0.25 | 0.78 | 0.58 | 0.76 | 1.00 | -0.24 |
| 0.25 | 362.75 | | 0.25 | 0.13 | 0.16 | 0.09 | | 0.30 | 0.80 | 0.62 | 0.80 | 1.00 | -0.20 |
| 0.30 | 387.90 | | 0.30 | 0.02 | 0.04 | 0.04 | | 0.35 | 0.82 | 0.64 | 0.89 | 1.00 | -0.11 |
| 0.35 | 413.05 | | 0.35 | 0.02 | 0.02 | 0.09 | | 0.40 | 0.84 | 0.69 | 0.89 | 1.00 | -0.11 |
| 0.40 | 438.20 | | 0.40 | 0.02 | 0.04 | 0.00 | | 0.45 | 0.89 | 0.71 | 0.89 | 1.00 | -0.11 |
| 0.45 | 463.35 | | 0.45 | 0.04 | 0.02 | 0.00 | | 0.50 | 0.93 | 0.73 | 0.91 | 1.00 | -0.09 |
| 0.50 | 488.50 | | 0.50 | 0.04 | 0.02 | 0.02 | | 0.55 | 0.93 | 0.78 | 0.91 | 1.00 | -0.09 |
| 0.55 | 513.65 | | 0.55 | 0.00 | 0.04 | 0.00 | | 0.60 | 0.93 | 0.78 | 0.93 | 1.00 | -0.07 |
| 0.60 | 538.80 | | 0.60 | 0.00 | 0.02 | 0.02 | | 0.65 | 0.93 | 0.80 | 0.93 | 1.00 | -0.07 |
| 0.65 | 563.95 | | 0.65 | 0.00 | 0.02 | 0.00 | | 0.70 | 0.93 | 0.82 | 0.96 | 1.00 | -0.04 |
| 0.70 | 589.10 | | 0.70 | 0.00 | 0.02 | 0.02 | | 0.75 | 0.93 | 0.84 | 0.96 | 1.00 | -0.04 |
| 0.75 | 614.25 | | 0.75 | 0.00 | 0.00 | 0.00 | | 0.80 | 0.93 | 0.84 | 0.96 | 1.00 | -0.04 |
| 0.80 | 639.40 | | 0.80 | 0.04 | 0.02 | 0.00 | | 0.85 | 0.98 | 0.87 | 0.96 | 1.00 | -0.04 |
| 0.85 | 664.55 | | 0.85 | 0.00 | 0.02 | 0.00 | | 0.90 | 0.98 | 0.84 | 0.96 | 1.00 | -0.04 |
| 0.90 | 689.70 | | 0.90 | 0.00 | 0.02 | 0.00 | | 0.95 | 0.98 | 0.87 | 0.96 | 1.00 | -0.04 |
| 0.95 | 714.85 | | 0.95 | 0.00 | 0.00 | 0.00 | | 1.00 | 0.98 | 0.91 | 0.96 | 1.00 | -0.04 |
| 1.00 | 740.00 | | 1.00 | 0.00 | 0.04 | 0.00 | | | | | | | |

FIG. 7C

| percentile bins | participant 1 | participant 2 | participant 3 |
|---|---|---|---|
| 0 | 0.119281 | 0.023256 | -0.023718 |
| 0.05 | 0.161765 | 0 | -0.000848 |
| 0.1 | -0.02795 | 0.069767 | -0.012345 |
| 0.15 | -0.124527 | 0.046512 | -0.156741 |
| | | | |
| AUC 0.0 - 0.05 | 0.140523 | 0.011628 | -0.012283 |
| AUC 0.05 - 0.10 | =(B3+B4)/2 | 0.0348835 | -0.0065965 |
| AUC 0.10 - 0.15 | -0.0762385 | 0.0581395 | -0.084543 |
| Total AUC 0.0-0.15 | 0.131192 | 0.104651 | -0.1034225 |

FIG. 9B

SYSTEMS AND METHODS FOR TESTING OF MULTISENSORY INTEGRATION EFFECTS

CROSS-REFERENCE TO RELATED APPLICATION

This application claims the benefit of U.S. Provisional Application No. 62/908,180 filed Sep. 30, 2019, which is hereby incorporated by reference herein in its entirety.

BACKGROUND

The present disclosure relates generally to techniques for testing of multisensory integration of a user. In particular, the present disclosure specifically relates to quantifying visual, auditory, and/or and somatosensory effects, individually, and in combination, in a laboratory and/or mobile (e.g., non-laboratory) environment.

SUMMARY

According to embodiments of the present disclosure, systems for, methods for, and computer program products for testing of multisensory integration of a user are presented. In various embodiments, the method includes providing a mobile device comprising a first signaling modality, a second signaling modality, and a response sensor. A first plurality of signals are provided to the user from the first signaling modality. A second plurality of signals are provided to the user from the second signaling modality. Indications are received at the response sensor from the user in response to each of the first and second plurality of signals. Reaction times between each of the first and second plurality of signals and the respective indication are determined. An observed curve is generated based on the determined reaction times. A differential curve is determined from the observed curve and a predicted curve. An area under at least a portion of the differential curve is determined. When the area is above a predetermined threshold, an indication that the user has satisfactory integrated sensory information is provided. When the area is below the predetermined threshold, an indication that the user has unsatisfactory integrated sensory information is provided.

In various embodiments, the computer program product for testing of multisensory integration of a user includes a computer readable storage medium having program instructions embodied therewith and the program instructions are executable by a processor to cause the processor to perform a method including providing a first plurality of signals to the user from a first signaling modality of a mobile device. A second plurality of signals are provided to the user from a second signaling modality of the mobile device. Indications are received at a response sensor of the mobile device from the user in response to each of the first and second plurality of signals. Reaction times between each of the first and second plurality of signals and the respective indication are determined. An observed curve is generated based on the determined reaction times. A differential curve is determined from the observed curve and a predicted curve. An area under at least a portion of the differential curve is determined. When the area is above a predetermined threshold, an indication that the user has satisfactory integrated sensory information is provided. When the area is below the predetermined threshold, an indication that the user has unsatisfactory integrated sensory information is provided.

In various embodiments, a system for testing of multisensory integration of a user includes a mobile device having a first signaling modality, a second signaling modality, a response sensor, and a computing node comprising a computer readable storage medium having program instructions embodied therewith. The program instructions are executable by a processor of the computing node to cause the processor to perform a method including providing a first plurality of signals to the user from a first signaling modality. A second plurality of signals are provided to the user from a second signaling modality. Indications are received at a response sensor from the user in response to each of the first and second plurality of signals. Reaction times between each of the first and second plurality of signals and the respective indication are determined. An observed curve is generated based on the determined reaction times. A differential curve is determined from the observed curve and a predicted curve. An area under at least a portion of the differential curve is determined. When the area is above a predetermined threshold, an indication that the user has satisfactory integrated sensory information is provided. When the area is below the predetermined threshold, an indication that the user has unsatisfactory integrated sensory information is provided.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIGS. 2B-2L illustrate exemplary screens of a mobile device for testing of multisensory integration effects of a user according to embodiments of the present disclosure.

FIGS. 3A-3C illustrate an exemplary calculation of the frequency of a response time (RT) occurring within a specified range of RTs for each experimental condition according to embodiments of the present disclosure.

FIG. 4 illustrates an exemplary cumulative distribution frequency according to embodiments of the present disclosure.

FIG. 5A illustrates an exemplary spreadsheet for a cumulative probability distribution of the observed (i.e., actual) multisensory condition according to embodiments of the present disclosure.

FIG. 7A illustrates an exemplary generation of a difference curve according to embodiments of the present disclosure. FIG. 7C illustrates an exemplary recordation of data according to embodiments of the present disclosure.

FIGS. 9A-9D illustrate an exemplary calculation of an individual's area under the curve according to embodiments of the present disclosure.

DETAILED DESCRIPTION

Figure 1:
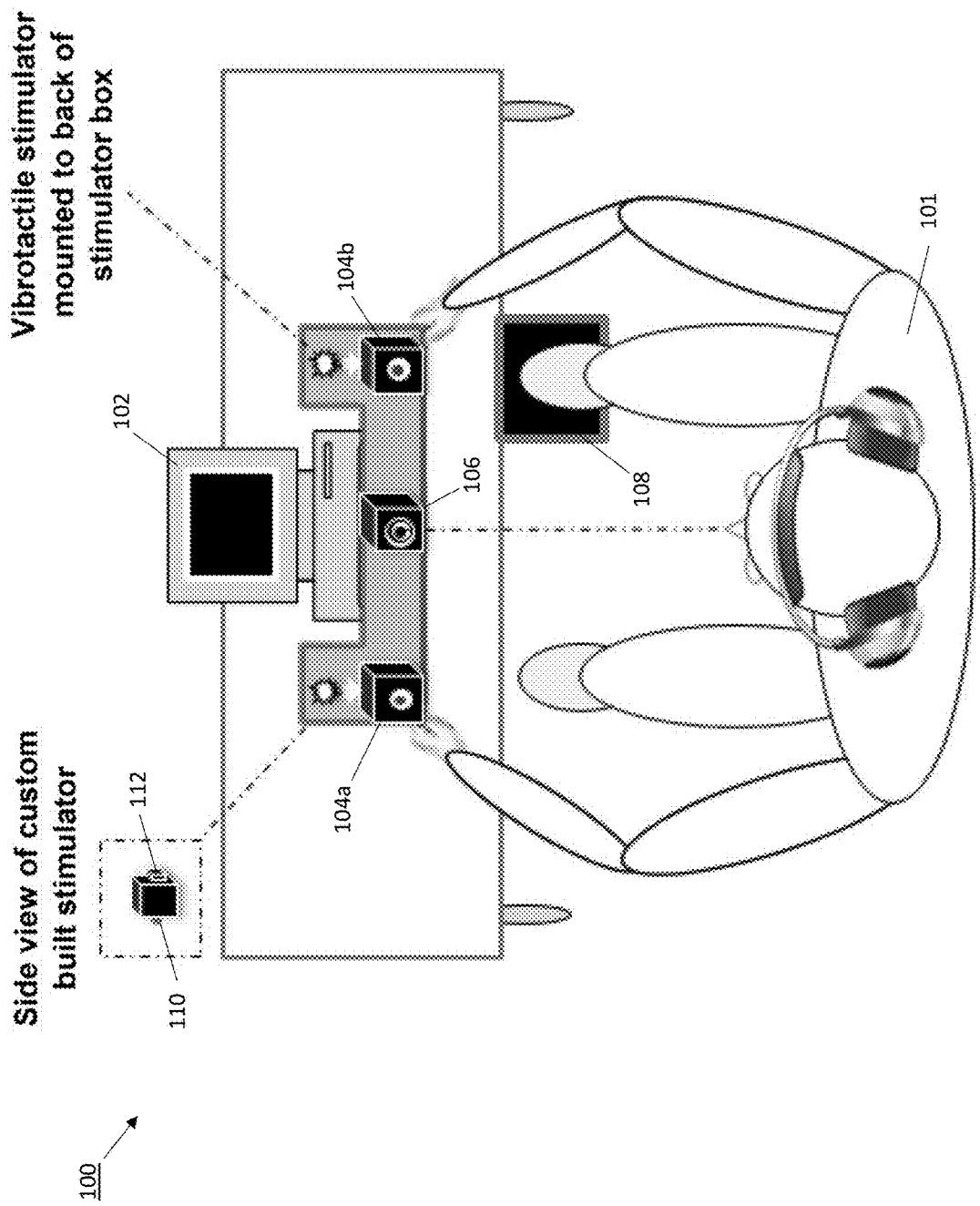
FIG. 1 illustrates a system for testing of multisensory integration effects of a user according to embodiments of the present disclosure.

According to embodiments of the present disclosure, systems for, methods for, and computer program products for testing of multisensory integration of a user are presented. In various embodiments, the method includes providing unisensory and multisensory stimulation to the user from a signaling modality. Indications are received at a sensor from the user in response to either unisensory signals (visual or somatosensory alone) or a plurality of signals (concurrent visual-somatosensory) from a signaling device. The unisensory and multisensory signals, and no-stimulation (i.e., catch trials) are presented in random order, while accuracy and reaction times to the respective signals are recorded. An observed (i.e., actual) curve is generated based on probabilistic modeling of reaction time distributions to the multisensory condition and a predicted curve is generated based on probabilistic modeling of reaction time distributions to the two unisensory conditions. A differential curve is determined from the observed minus predicted curve and an area under at least a portion of this differential curve is determined. When the area is above a predetermined threshold, an indication that the user has satisfactory integrated sensory information is provided. When the area is below the predetermined threshold, an indication that the user has unsatisfactory integrated sensory information is provided.

Interactions across sensory systems are essential for everyday functions. While multisensory integration effects are measured across a wide array of populations using assorted sensory combinations and different neuroscience approaches (including but not limited to the psychophysical, electrophysiological, and neuroimaging methodologies), currently a gold standard for quantifying multisensory integration is lacking. Given that multisensory experiments typically contain a behavioral component, reaction time (RT) data is often examined to determine the existence of a well-known phenomenon called the redundant signals effect. As the name suggests, simultaneous sensory signals provide redundant information, which typically yield quicker RTs. Race and co-activation models may be used to explain the above mentioned redundant signals effect. Under race models, the unisensory signal that is processed the fastest is the winner of the race and is responsible for producing the behavioral response. However, evidence for co-activation occurs when responses to multisensory stimuli are quicker than what race models predict.

Earlier versions of the race model may be overly conservative and purportedly contain limitations regarding the independence between the constituent unisensory detection times inherent in the multisensory condition. In an effort to address some of these limitations, a more conventional race model test may be modeled as follows:

$$P(RT_{AB} \leq t) - \min[P(RT_A \leq t) + P(RT_B \leq t), 1] \qquad \text{Eqn. 1}$$

where the cumulative distribution frequencies (CDFs) of the unisensory conditions (e.g., A & B; with an upper limit of one) are compared to the CDF of the simultaneous multisensory condition (e.g., AB) for any given latency (t). In general, a CDF determines how often an RT occurs, within a given range of RTs, divided by the total number of stimulus presentations (i.e., trials). If the CDF of the actual multisensory condition $[P(RT_{AB} \leq t)]$ is less than or equal to the predicted CDF derived from the unisensory conditions of $$\min[P(RT_A \leq t) + P(RT_B \leq t), 1]$$

then the race model is accepted and there is no evidence for sensory integration. However, when the multisensory CDF is greater than the predicted CDF derived from the unisensory conditions, the race model is rejected. Rejection of the race model indicates that multisensory interactions from redundant sensory sources combine in a non-linear manner, resulting in a speeding up of RTs (e.g., RT facilitation) to multisensory stimuli.

One hurdle that multisensory researchers face is how to best quantify integration effects. For instance, in the case of the most basic behavioral multisensory paradigm, where participants are asked to perform a simple reaction time task, information regarding accuracy and speed is collected. Such multisensory data can be used at the face-value or manipulated using various mathematical applications including but not limited to Maximum Likelihood Estimation, CDFs, and various other statistical approaches. Previous multisensory studies employed both quantitative and probabilistic approaches where multisensory integrative effects were calculated by 1) subtracting the mean reaction time (RT) to a multisensory event from the mean reaction time (RT) to the shortest unisensory event, and 2) by employing CDFs to determine whether RT facilitation resulted from synergistic interactions facilitated by redundant sensory information. However, the former methodology may not be sensitive to the individual differences in integrative processes and researchers have since posited that the later methodology (i.e., CDFs) may provide a better proxy for quantifying multisensory integrative effects.

Figure 8:
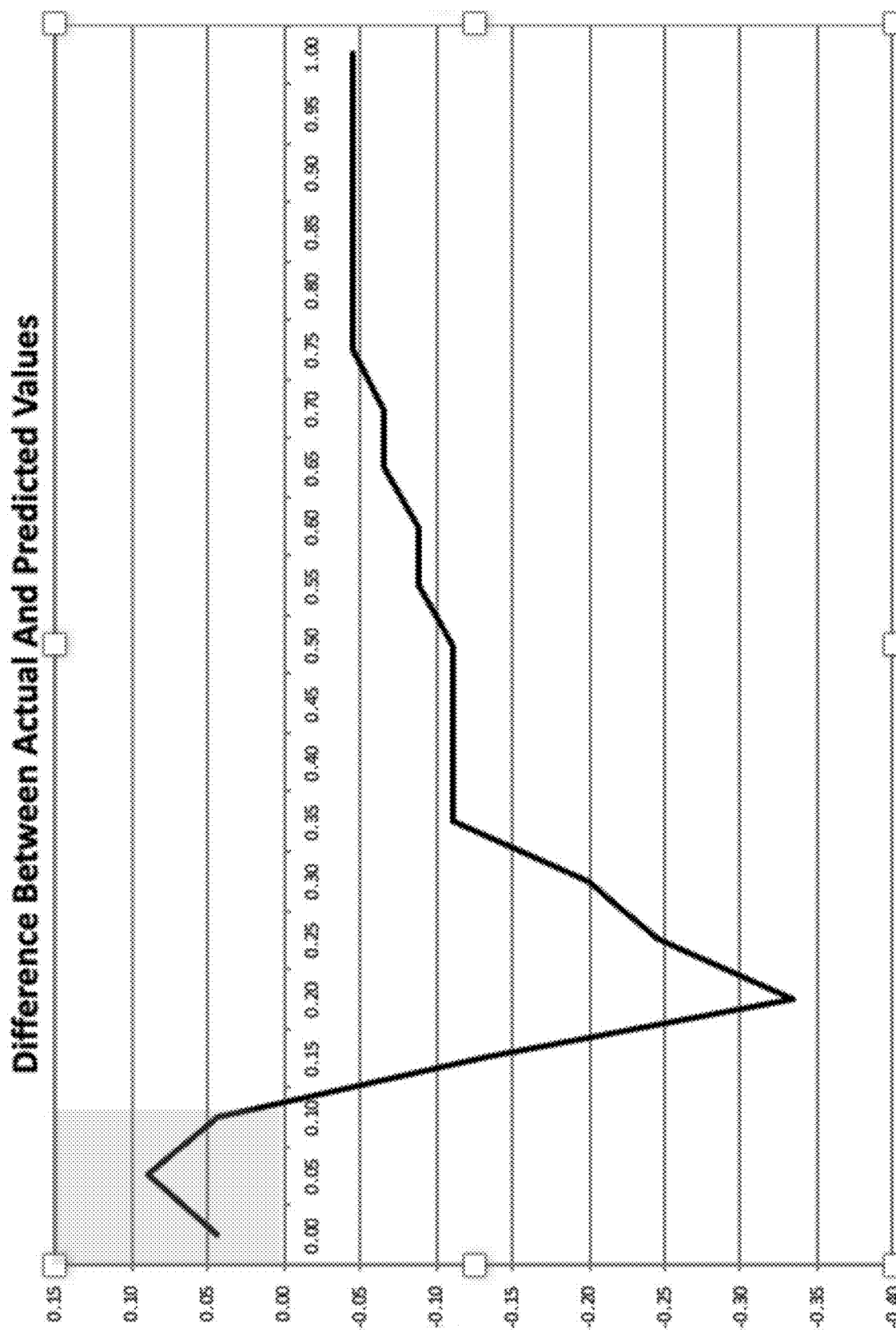
FIG. 8 illustrates an area under the curve for the graph of the difference that is indicative of multisensory integration according to embodiments of the present disclosure.

To accurately test the Race Model Inequality (RMI), it may be unfavorable to apply data trimming procedures where certain a priori minimum and maximum RT limits are set. In various embodiments, slow and omitted responses may be set to infinity, rather than excluded. Second, given that the RMI may be violated at any latency, multiple t-tests may be used to test the RMI at different time points (e.g., quantiles); unfortunately, this practice may lead to the increased Type I error and substantially reduced statistical power. To avoid these issues, the RMI may be tested over one specific time range. In various embodiments, testing of the fastest quartile of responses (0-25%) or some pre-identified windows (i.e., 10-25%) as multisensory integration effects are typically observed during that time interval. In various embodiments, the percentile range to be tested may be dictated by the actual dataset. In various embodiments, a problem with relying on published data from young adults or computer simulations is that older adults manifest very different RT distributions, likely due to the age-related declines in sensory systems. In various embodiments, race model significance testing may be tested over violated portions (positive values) of group-averaged difference wave between actual and predicted CDFs from the study cohort (as shown in FIG. 8).

To this end, a protective effect of multisensory integration in healthy older adults using the conventional test of the race model and the principles set forth by Gondan and colleagues may be demonstrated. In fact, greater magnitude of visual-somatosensory RMI (a proxy for multisensory integration) may be linked to better balance performance, lower probability of incident falls and increased spatial gait performance.

The present disclosure describes a step-by-step tutorial to calculate the magnitude of multisensory integration effects using the RMI and to facilitate the increased production of diverse translational research studies across many different clinical populations. In various embodiments, this methodology can be applied to various clinical cohorts across many different experimental designs, utilizing a wide-array of multisensory combinations.

Protocol—Experimental Design

Figure 11:
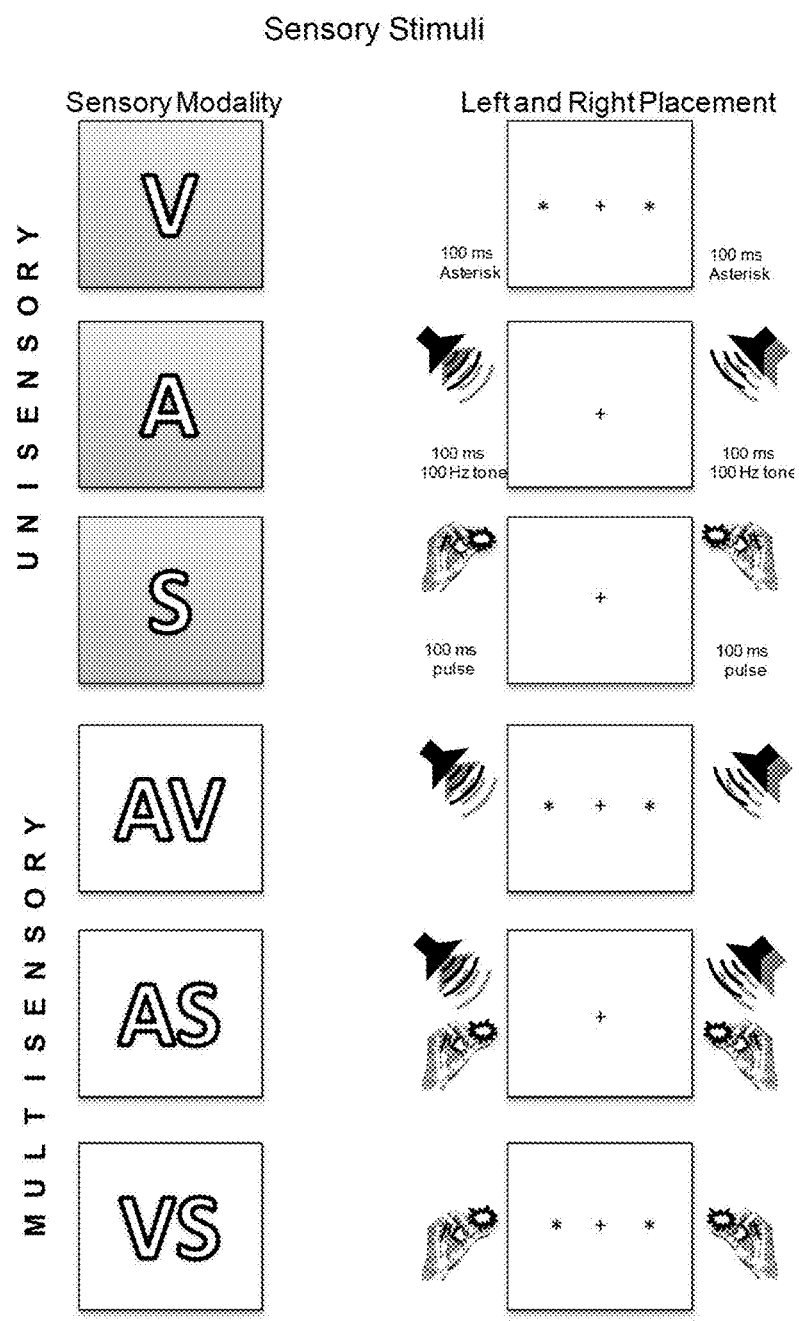
FIG. 11 illustrates various exemplary multisensory and unisensory stimuli according to embodiments of the present disclosure.

At step 1, use a stimulus presentation software to program a reaction time test with at least three conditions: visual (V) alone, somatosensory (S) alone, and simultaneous visual-somatosensory (VS). In various embodiments, as shown in FIG. 11, the stimulus presentation software may provide an auditory (A) stimulus alone. In various embodiments, the stimulus presentation software may provide any combination of visual, somatosensory, and/or auditory stimuli. For example, the stimulus presentation software may provide visual-auditory (VA) stimuli together, visual-somatosensory (VS) stimuli together, auditory-somatosensory (AS) stimuli together, and/or visual-auditory-somatosensory (VAS) stimuli together to a user in a reaction time test. In various embodiments, participants may be instructed to respond to each sensory stimulus, regardless of the condition, as quickly as possible. Data from an exemplary visual-somatosensory response time test can be found in Tables S1A through S1D.

In various embodiments, a stimulus generator may be used with three control boxes (30.48 mm×20.32 mm×12.70 mm) and plastic housing for stimulators. In various embodiments, the left and right control boxes may contain bilateral lights (e.g., blue light emitting diodes) (LEDs; 15.88 cm diameter) that illuminate for visual stimulation and bilateral motors with 0.8 G vibration amplitude that vibrate for somatosensory stimulation (equivalent to a cell-phone vibration). In various embodiments, stimulus generators may provide both unisensory (visual OR somatosensory alone), as well as multisensory (simultaneous visual AND somatosensory) stimulation. In various embodiments, a center dummy control box may be placed equidistant (28 cm) from the left and right control boxes and a visual target sticker may be affixed (central circle of 0.4 cm diameter) to serve as the fixation point. In various embodiments, the stimulus generator may be connected to the experimental computer via the parallel port which allows the direct control for each stimulator In various embodiments, the stimulus presentation software is programmed to send transistor-transistor-logic (TTL, 5 V) pulses to the trigger stimulus generators on and off directly via the parallel port. In various embodiments, the stimulus presentation time may be set to 100 ms in duration, although one skilled in the art will recognize that any suitable duration may be used. It will be appreciated that a variety of alternative stimuli may be included, such as auditory stimuli, or display of objects on a screen (e.g., LCD).

Figure 12:
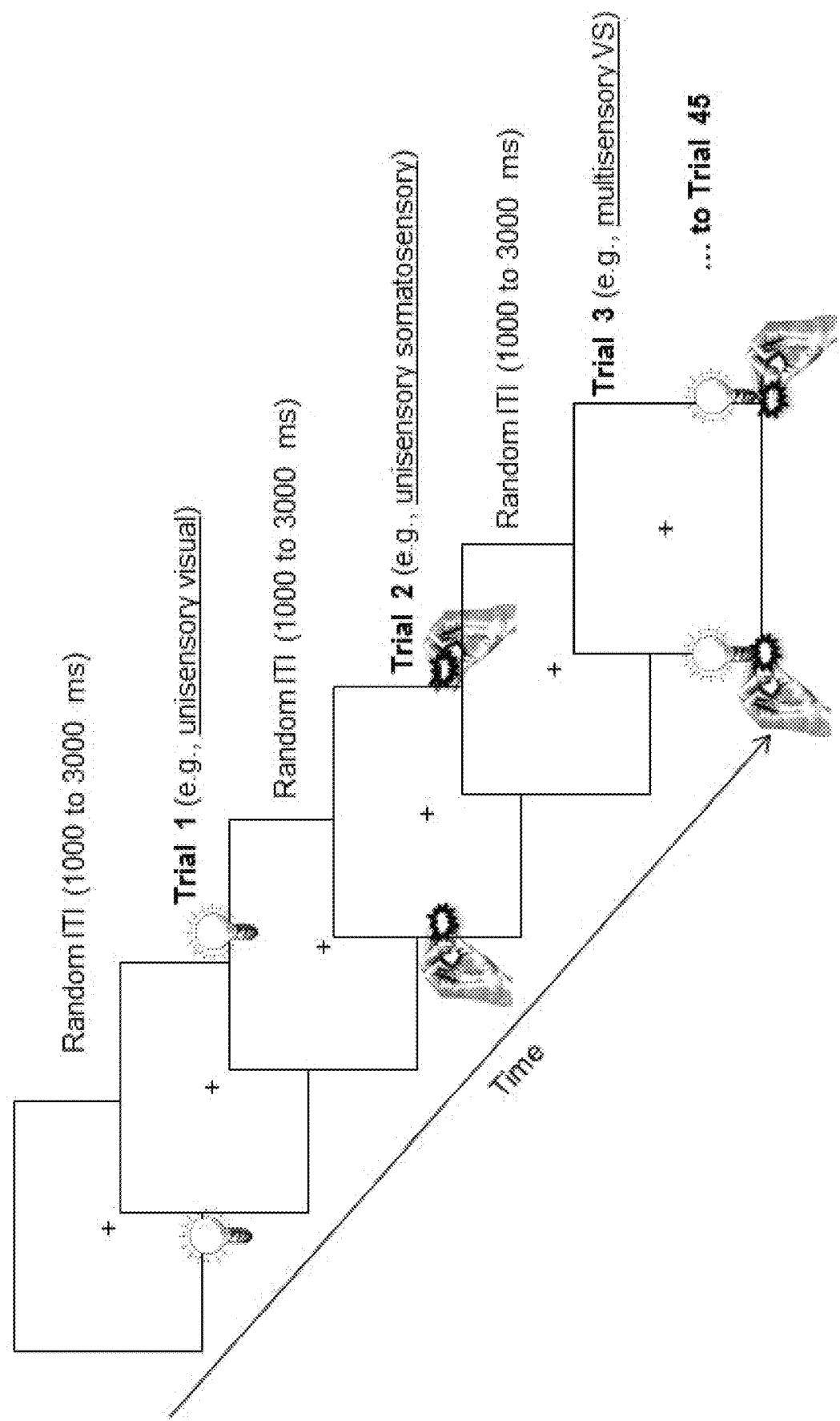
FIG. 12 illustrates an exemplary process for a unisensory and multisensory integration experiment according to embodiments of the present disclosure.

At step 2, in the stimulus presentation software, a minimum of 3 experimental blocks may be programmed each consisting of 45 trials (15 trials of each stimulus condition presented in random order) for a total of 135 stimulus presentations for this simple reaction time experiment. A process for an exemplary unisensory (e.g., visual only, somatosensory only) and multisensory (e.g., visual and somatosensory) integration experiment with 45 trials is shown in FIG. 12.

At step 3, the inter-stimulus-interval may be varied randomly (e.g., between 1 and 3 seconds) to prevent anticipatory effects. In various embodiments, catch trials may be inserted where the stimulus parameters are the same as above, but the TTL pulse is not sent, thus no visual or somatosensory stimulation occurs and, therefore, no response is expected.

At step 4, participants may be allowed up to a predetermined time limit (e.g., 2,000 ms) to respond to any given stimulus condition. In various embodiments, if no response is detected within the 2,000 ms response period, the stimulus presentation software may advance to the next trial automatically. In various embodiments, the predetermined time limit may be set to keep the total experimental time to a minimum. In various embodiments, longer RTs than the predetermined time limit may be set to infinity.

At step 5, the three experimental blocks may be separated by programming breaks (e.g., 20 seconds) in the stimulus presentation software to reduce potential fatigue and increase concentration (FIG. 2I). In various embodiments, each subsequent block may start immediately after the break concludes.

Figure 2A:
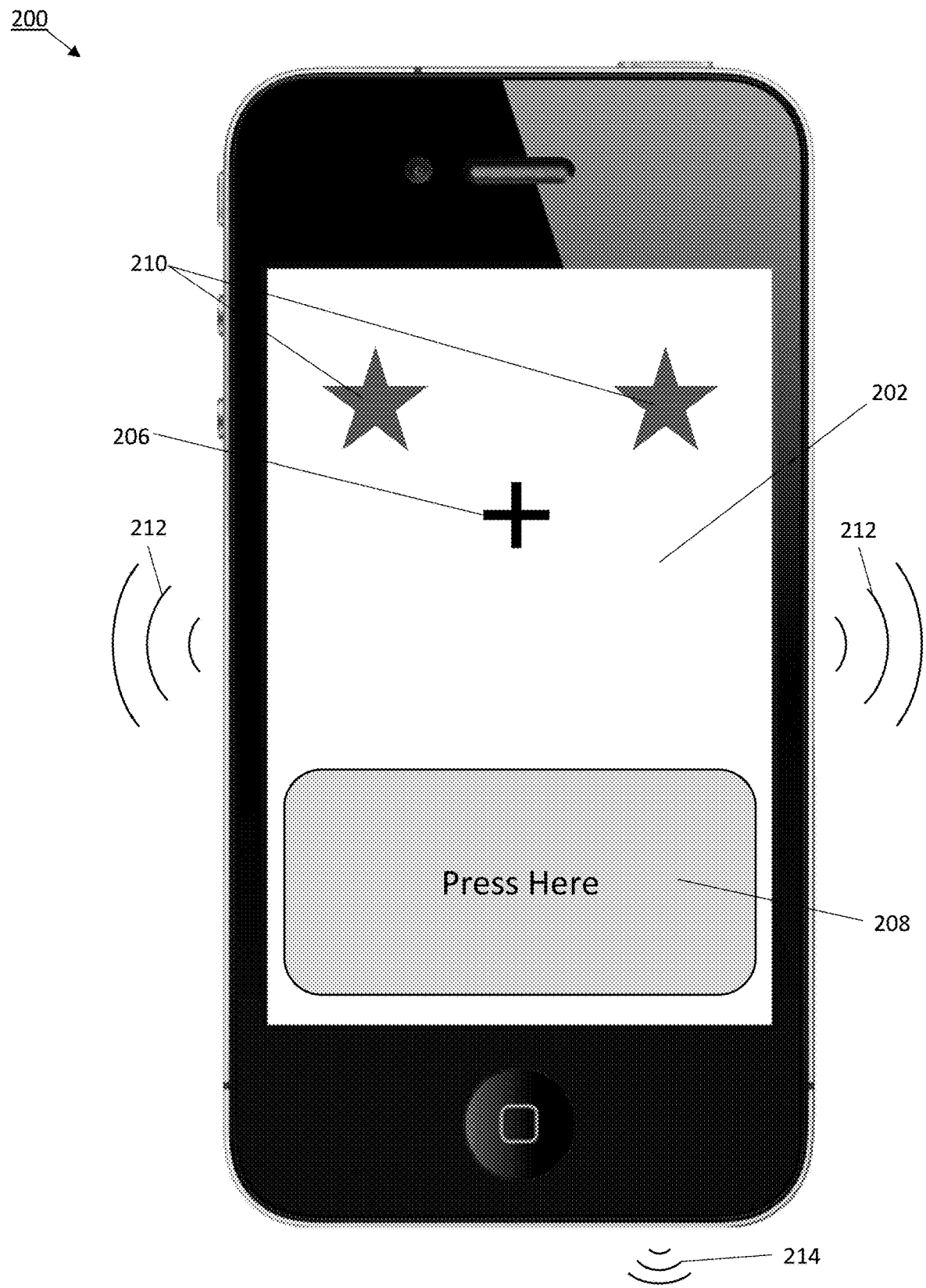
FIG. 2A illustrates an exemplary mobile device for testing of multisensory integration effects of a user according to embodiments of the present disclosure.
Figure 2B:
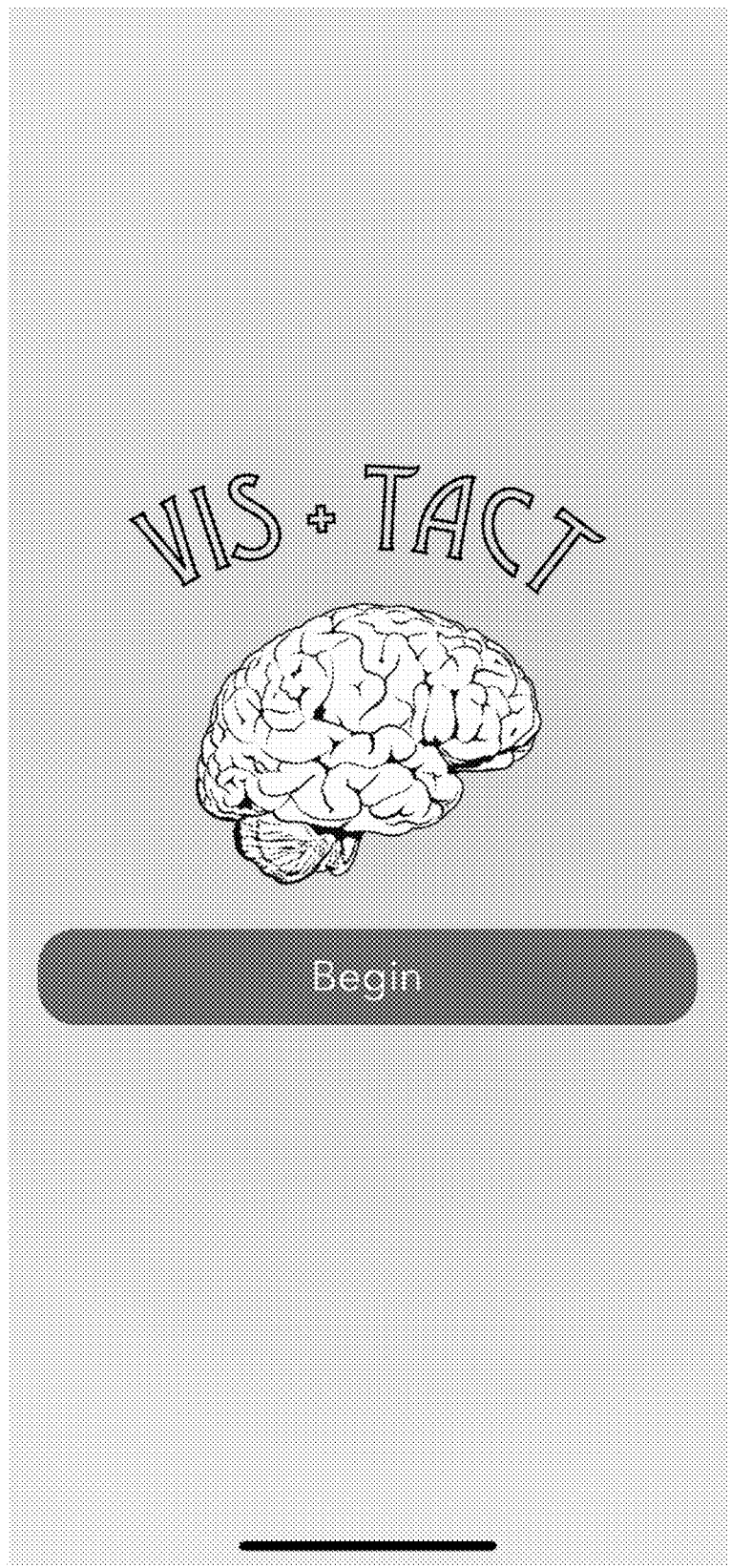
Figure 2C:
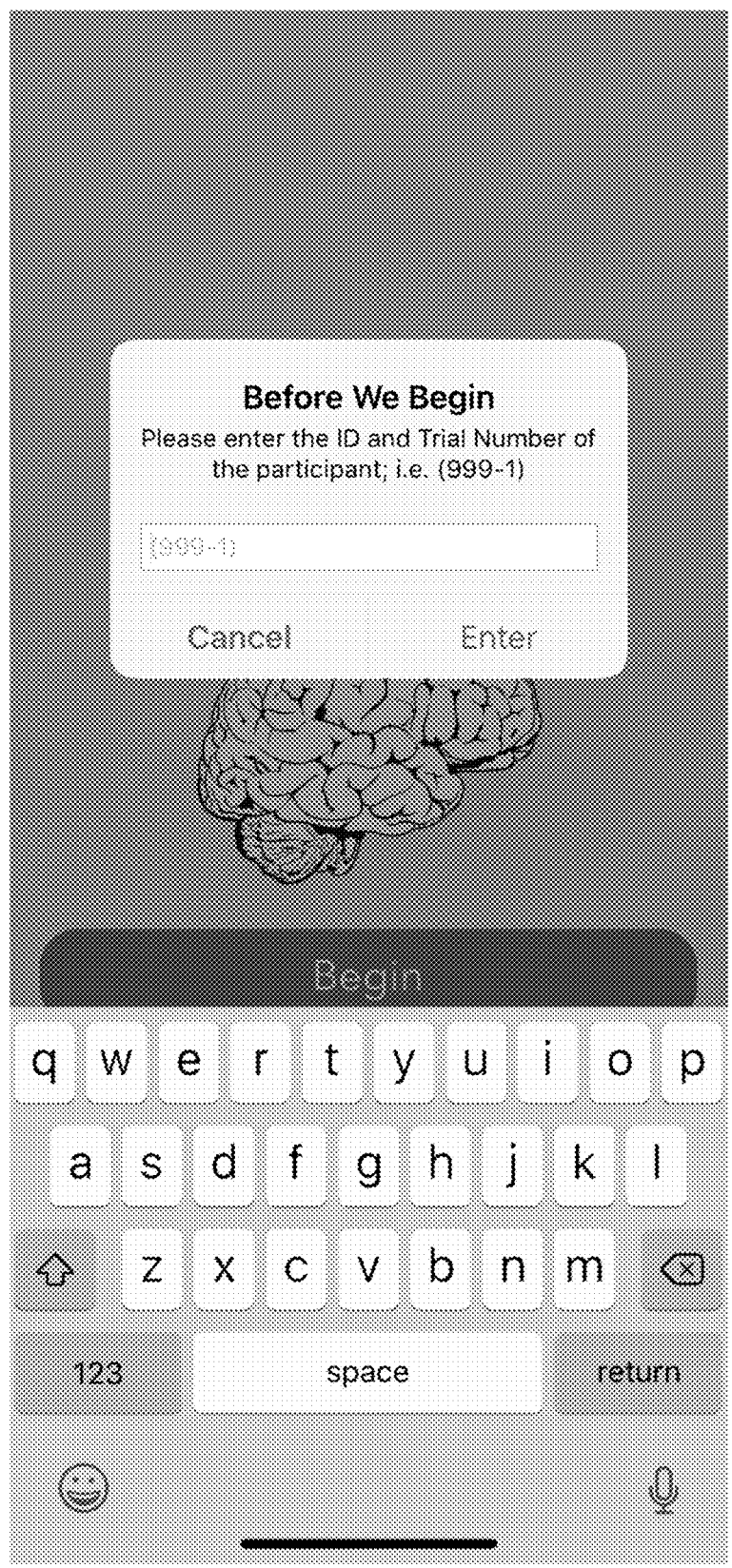
Figure 2D:
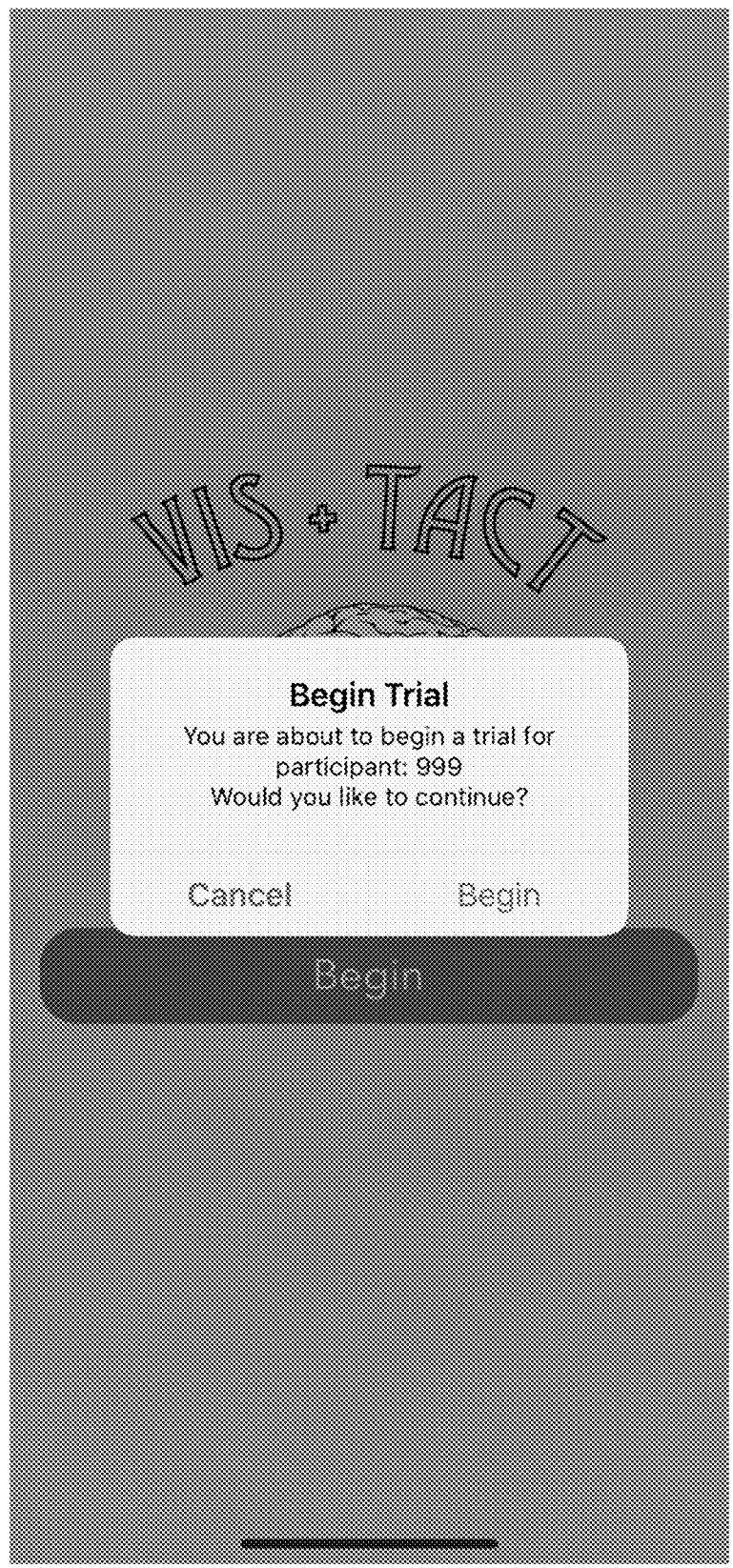
Figure 2E:
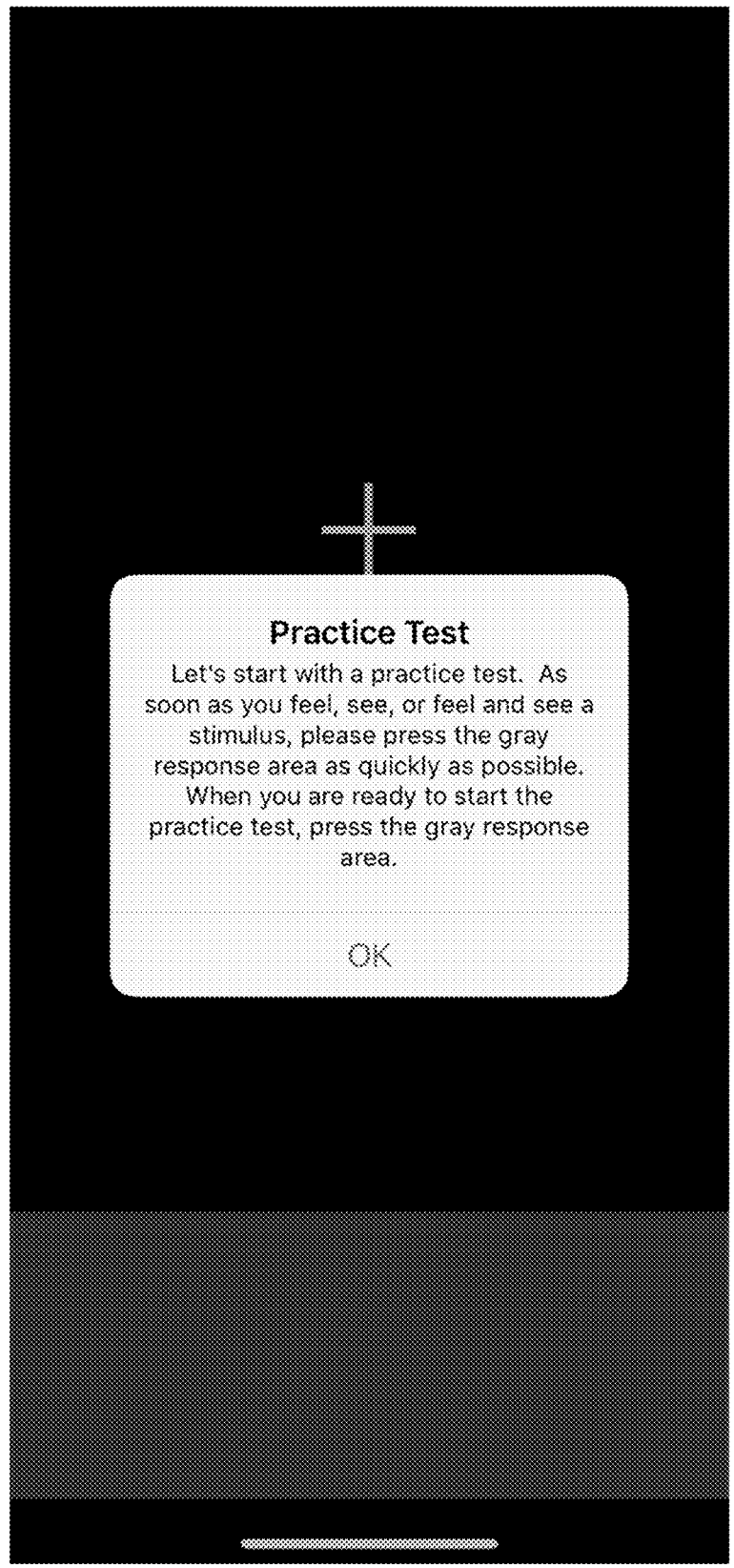
Figure 2F:
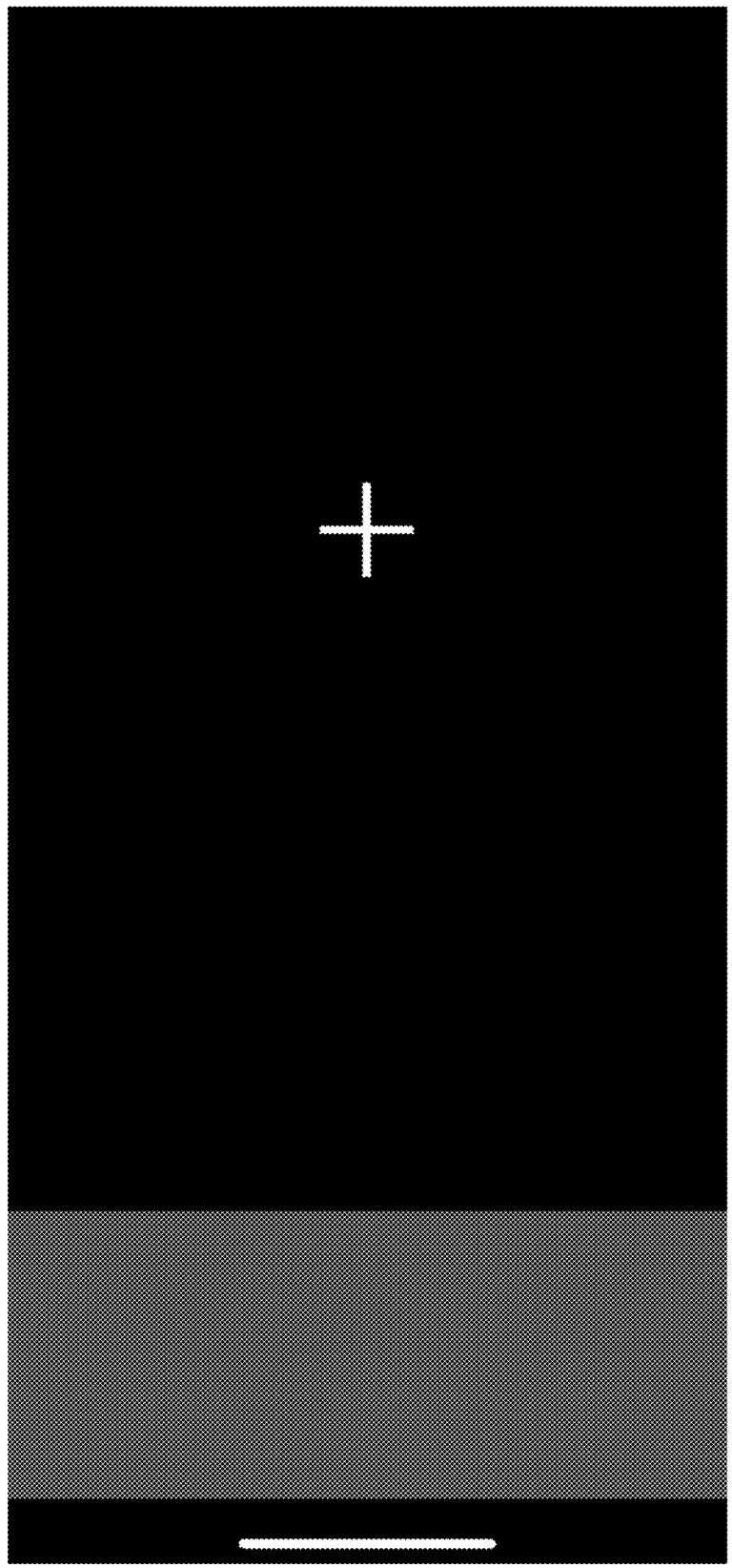
Figure 2G:
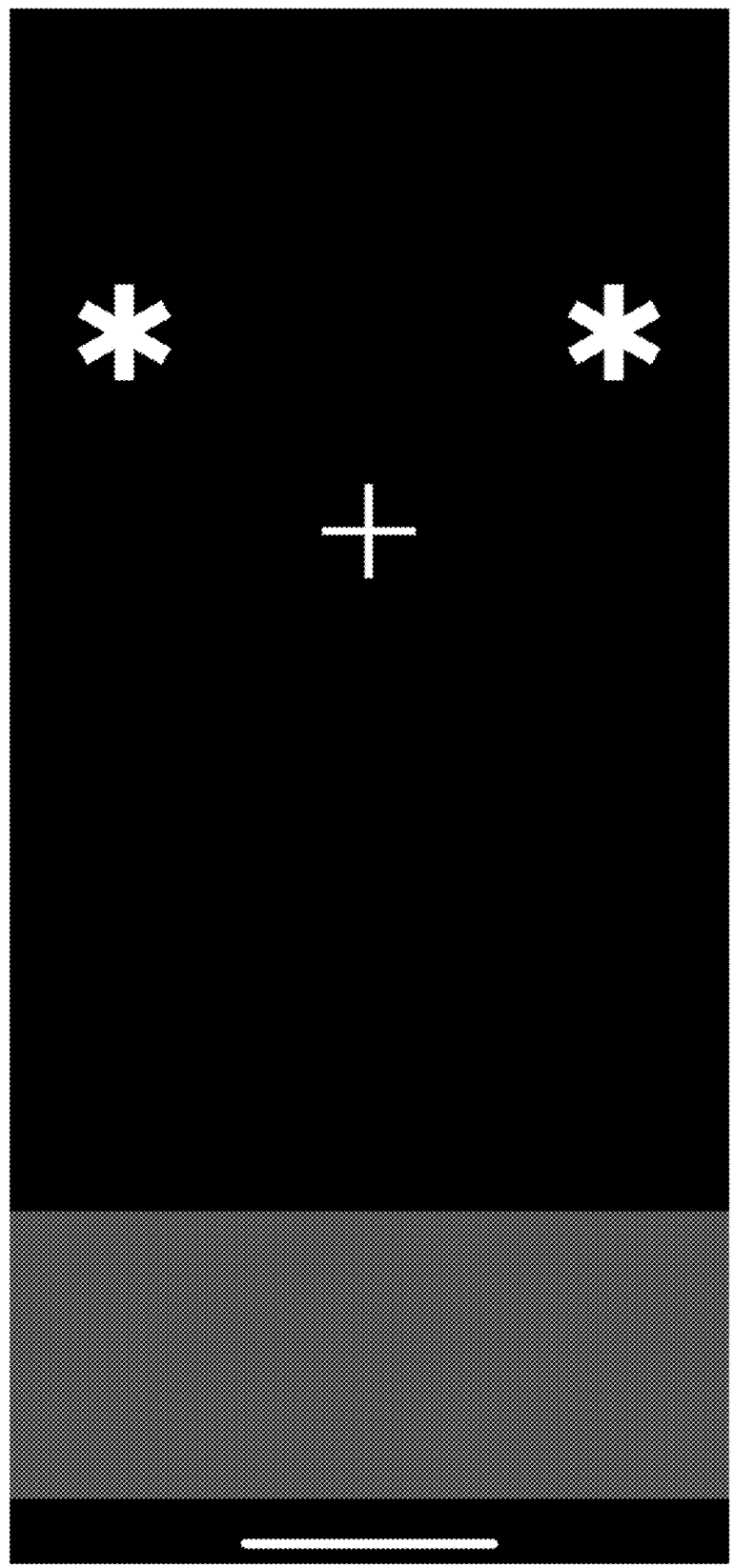
Figure 2H:
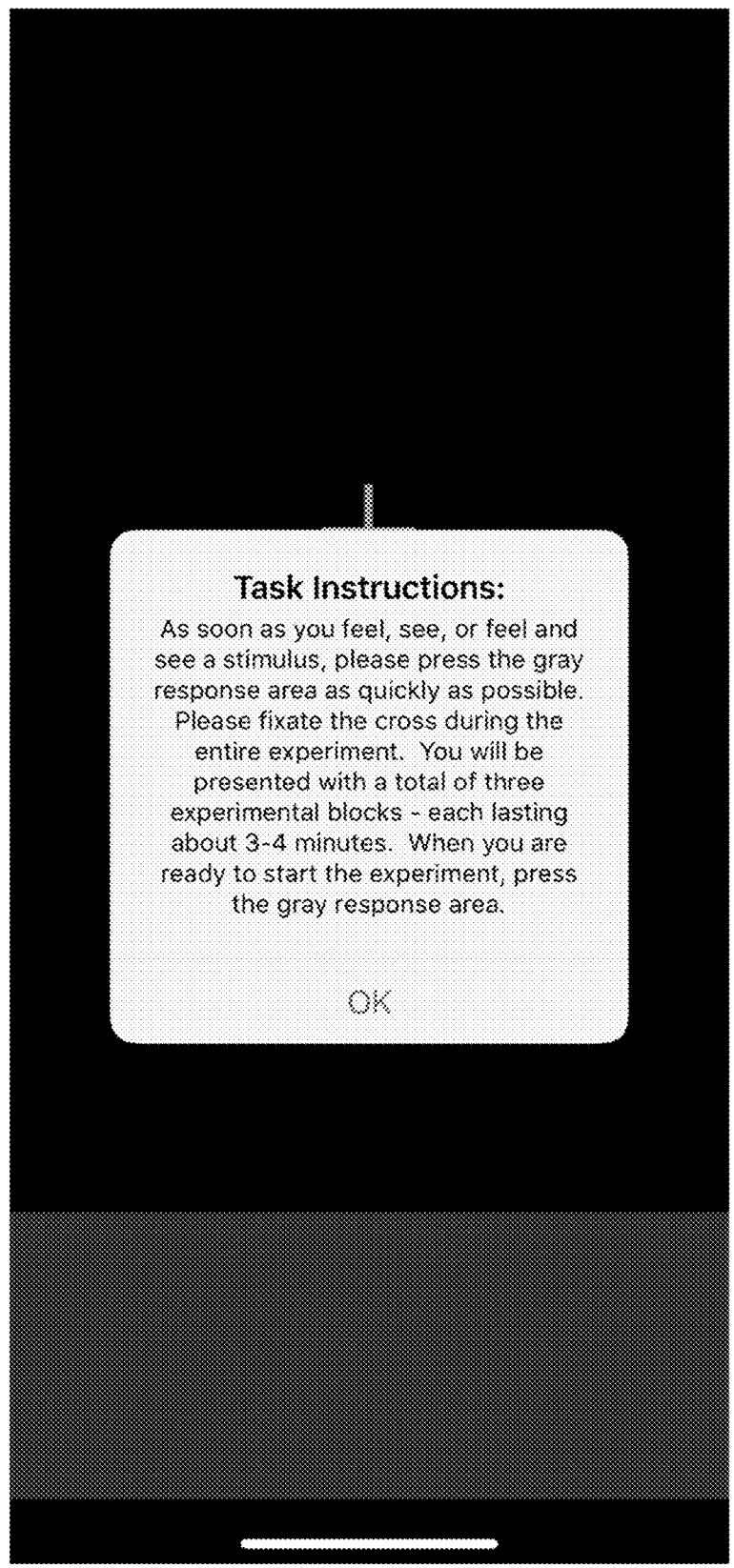
Figure 21:
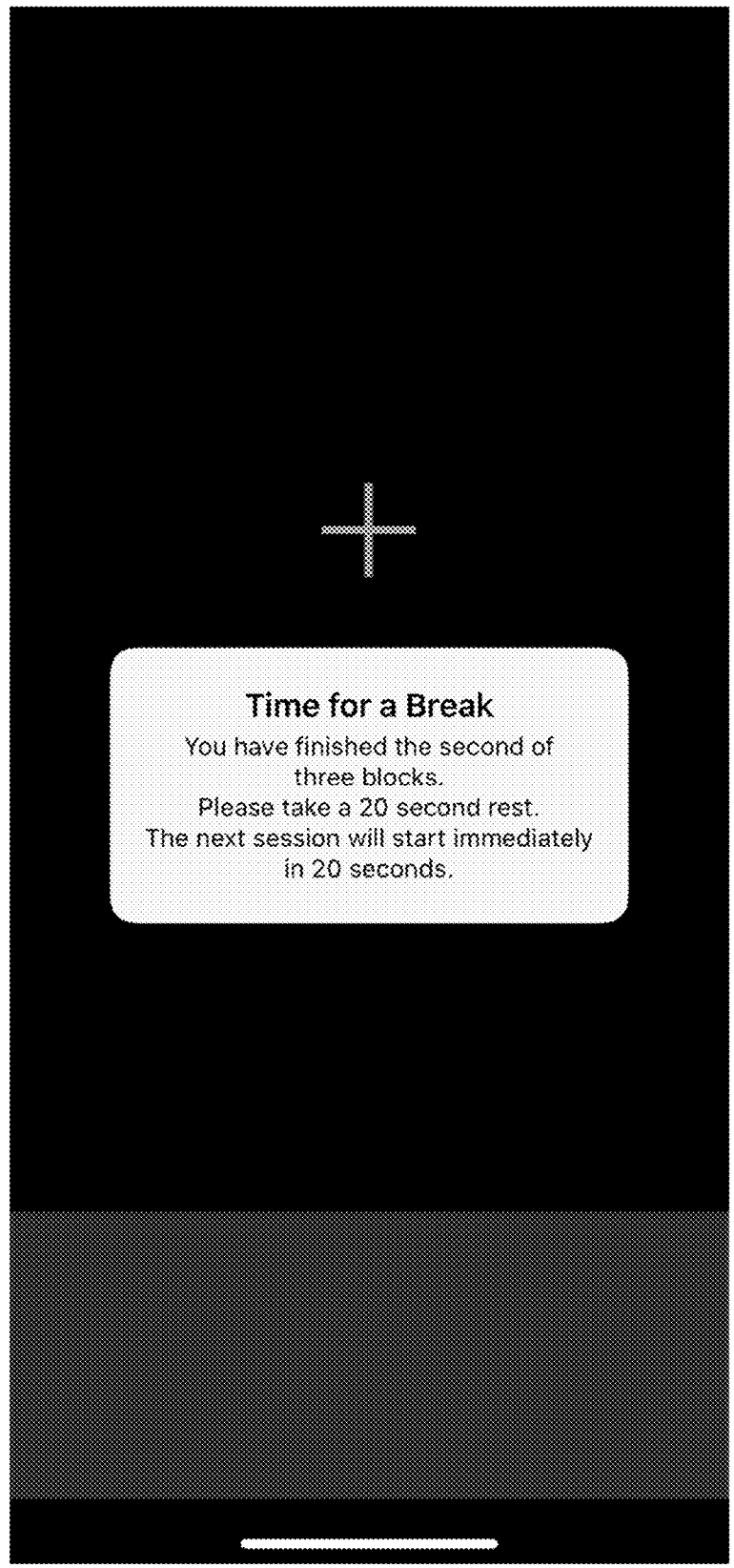
Figure 2J:
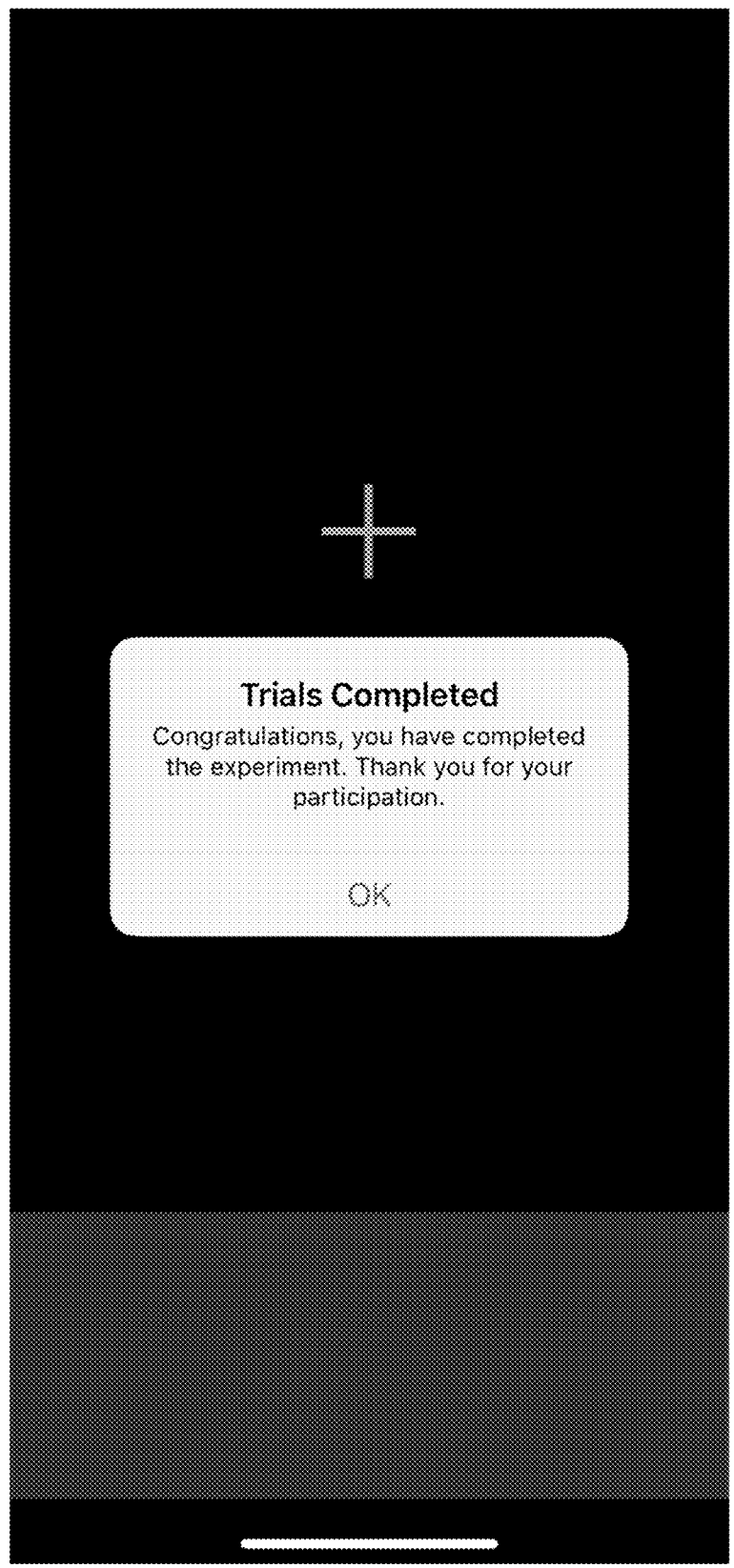
Figure 2K:
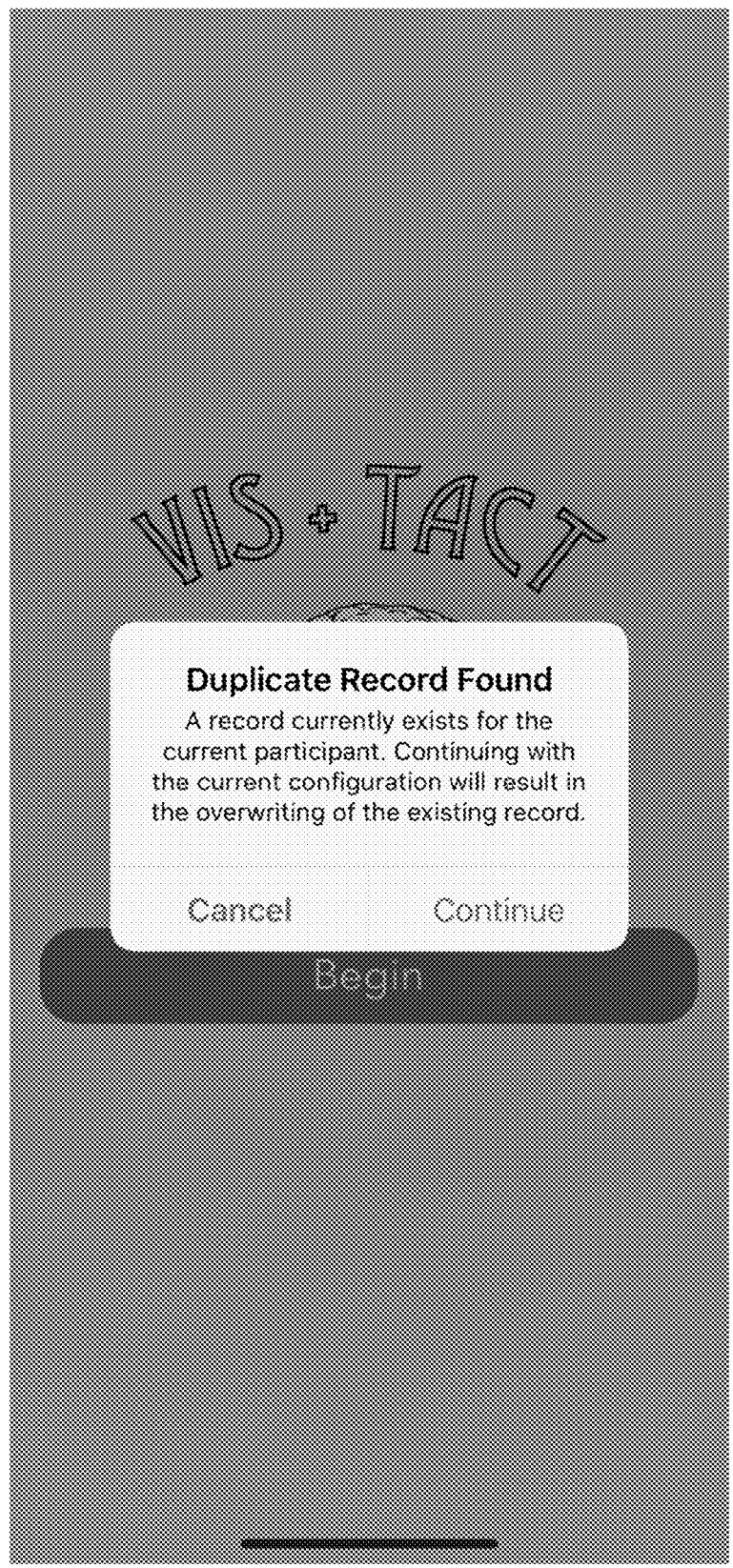
Figure 2L:
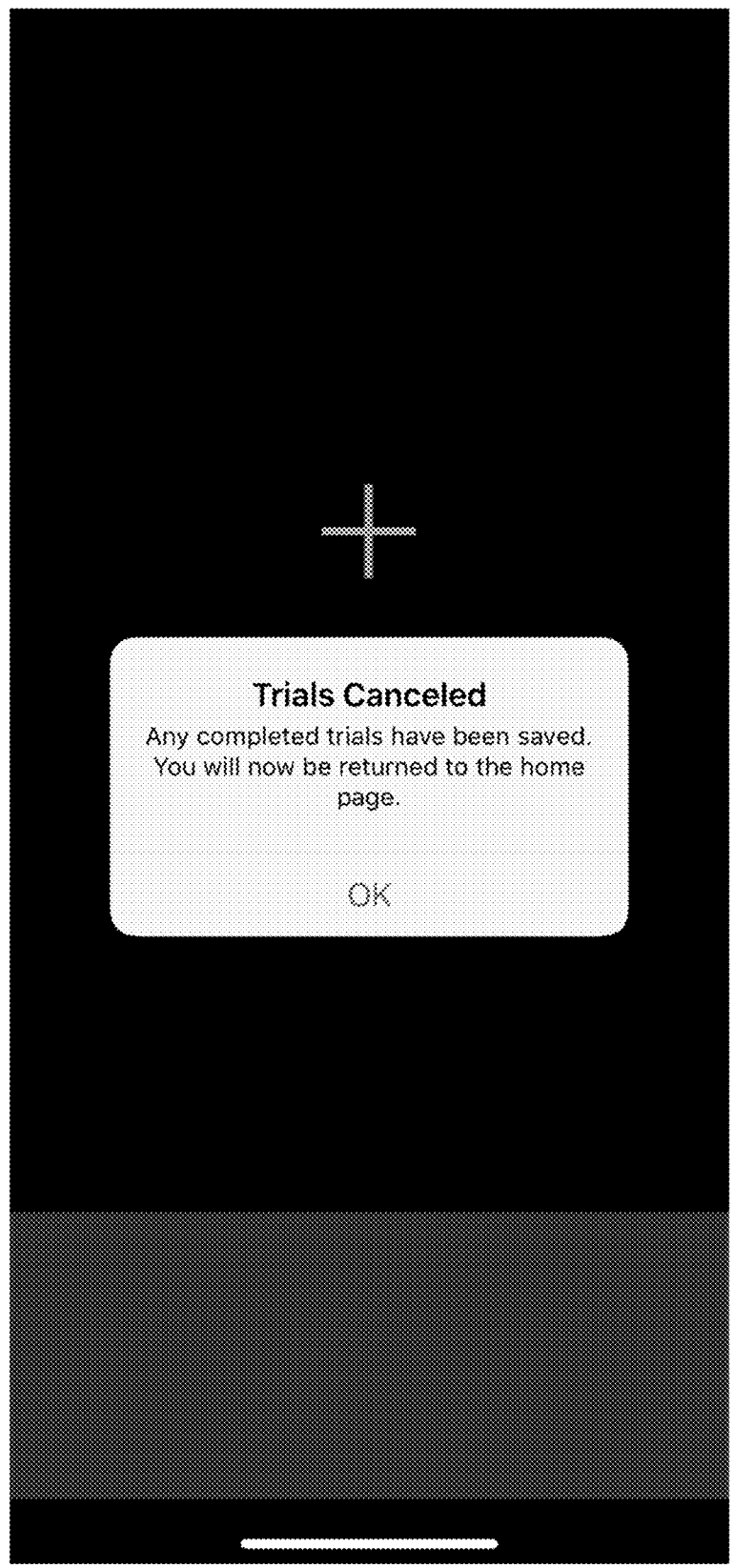

At step 6, written instructions may be programmed to appear on the visual display (monitor of the experimental computer or mobile device as in FIG. 2H). In various embodiments, the participant may be instructed to start the experiment by pushing the response sensor/pad (e.g., with their foot or hand) when ready to commence. In various embodiments, once the stimulus parameters are programmed, the stimulus presentation software creates a script that is to be run on each participant.

At step 7, participant ID and session number may be provided in order to run the experimental script (FIG. 2C). In various embodiments, once the experiment is completed, a unique behavioral data log may be produced for each participant. An exemplary output file from a software program of the present disclosure can be found in Tables S2A and S2B.

Protocol—Apparatus & Task

At step 1, participants may be instructed to sit upright and comfortably rest hands upon the left and right control boxes. In various embodiments, the participants may be instructed to place their index fingers over the vibratory motors mounted to the back of the control box, and thumbs on the front of the control box, under the LED to not block the light, as shown in FIG. 1. In various embodiments, participants may be provided with headphones over which continuous white noise is played at a comfortable level (typically 65-75 dBs) to ensure that the somatosensory stimuli are inaudible. In various embodiments, the participant may be provided a mobile device (e.g., mobile phone) having an application to perform the below protocol and record response times based on unisensory and/or multisensory stimuli.

At step 2, participants may be instructed to respond to all stimuli as quickly as possible. In various embodiments, participants may be asked to use a response sensor, e.g., a foot-pedal located under the right foot (or alternatively, left foot) as the response pad since fingers will be accepting somatosensory stimulation, as shown in FIG. 1. In various embodiments, where a mobile device is used, the response sensor may be a touch screen of the mobile device (e.g., mobile phone, tablet, etc.).

At step 3, performance accuracy may be calculated for each stimulus condition. In various embodiments, participants may be instructed to respond to each of the experimental stimuli (e.g., 45 per stimulus condition) as quickly as possible. In various embodiments, the number of accurately detected stimuli per condition may be divided over the total number of trials per condition (e.g., 45) to obtain measures of performance accuracy for visual, somatosensory, and VS conditions, respectively.

Protocol—Race Model Inequality Data Preparation (Individual Level)

At step 1, whether an individual's behavioral performance is valid may be determined. In various embodiments, participants that are not able to attain an accuracy of 70% correct or greater on any one stimulus condition may be excluded. In various embodiments, as the participant's performance accuracy on a simple reaction time task decreases, so does the reliability of the individual's data. In various embodiments, trials may be considered inaccurate (omitted) if a participant fails to respond to a stimulus within the set response time period and the corresponding RT may be set to infinity rather than excluding the trial from the analysis. In various embodiments, the group-averaged (n=289) stimulus detection was 96% across all conditions, and over 90% of the population had detection rates above 90% for all conditions. In various embodiments, data-trimming procedures that delete very slow RTs may be avoided as this could bias the distribution of RT data. In various embodiments, RTs that are clearly outliers may be set to infinity.

At step 2, the RT Data may be organized. In various embodiments, RT data may be sorted in ascending order by the experimental condition. In various embodiments, visual, somatosensory, and visual-somatosensory (VS) conditions may be placed in separate columns of sorted RT data. In various embodiments, each row may represent one trial and each cell may represent the actual RT (or infinity in the case of omitted or slow trials).

At step 3, the RT Data may be binned. In various embodiments, the fastest RT (to whichever condition) and the slowest RT (to whichever condition) may be identified. In various embodiments, the slowest RT may be subtracted from the fastest RT (e.g., 740 ms-237 ms) in order to calculate the individual's RT range (e.g., 503 ms). In various embodiments, the range may be calculated across all test conditions. Table 1 demonstrates how to calculate an individual's RT Range and depicts the various color ellipses. In various embodiments, RT data may be binned from the 0% (fastest RT=237 in this example) to the 100% (or slowest RT=740 in this example) in increments (e.g., 5% increments) by taking the fastest RT and gradually adding 5% of the RT range identified until 100% of the RT data is accounted for (see Table 2). In this example, 21-time bins result.

At step 4, the Cumulative Distribution Frequency (CDF) may be calculated for the experimental conditions. In various embodiments, a "FREQUENCY" function may be used where array 1 equals the actual RTs for one of the experimental conditions and array2 equals the 21 quantized RTs bins calculated above, divided by the total number of trials (45) per condition, as shown in FIG. 3A. In various embodiments, this function may be repeated for the other two experimental conditions (FIGS. 3B-3C) so as to populate frequencies (or probability (P)) of an RT occurring within each of the 21 quantized time bins, for each of the three experimental conditions. In various embodiments, the cumulative distribution frequency (CDF) may be calculated by summing the running total of probabilities across the quantized bins (0%, 0+5%, 0+5+10%, 0+5+10+15%, etc.) for each of three experimental conditions. For example, in the cumulative probability column for the Soma condition (column AE), the cumulative probability for the 95% ile range (cell AE22) is the summation of the probability values in cells Z3:Z23, as shown in FIG. 4.

At step 5, Actual and Predicted CDFs may be calculated. In various embodiments, the CDF of the multisensory condition may represent the observed (i.e., actual) CDF, as shown in column AF of FIGS. 5A-5B. In various embodiments, to calculate the predicted CDF (column AG), sum the two unisensory CDFs (with an upper limit set to 1) across each of the 21 quantized time bins, as shown in FIGS. 6A-6B. In various embodiments, calculating the predicted CDF may begin at the 0th percentile (bin 1) and continue to the 100th percentile (bin 21).

At step 6, a test of the Race Model Inequality (RMI) may be conducted. In various embodiments, the predicted CDF may be subtracted from the actual CDF for each of the 21 quantized time bins to obtain the difference values, as shown in column AH of FIG. 7A. In various embodiments, these 21 values may be plotted as a line graph (FIG. 7D), where the x-axis represents each one of the quantized time bins (column AC) and the y-axis represents the probability difference between the actual and predicted CDFs, as shown in column AH of FIG. 7C. In various embodiments, positive values may be identified at any latency (i.e., quantiles) which indicate the integration of the unisensory stimuli and reflect a violation of the RMI (see the highlighted portion of difference wave from 0.00-0.10 in FIG. 8).

Protocol—Quantification of the Multisensory Effect (Group Level)

At step 1, the individual RMI data (differences between predicted CDF and the actual CDF for each of the 21-time bins; column AH) may be group-averaged across all participants. In various embodiments, individuals may be assigned to rows and time bins assigned to columns. In various embodiments, The 21 values may be calculated in individual rows (1 row per participant), and values may be averaged within time bins to create one group-averaged difference waveform.

At step 2, the group average 21 values may be plotted as a line graph, where the x-axis represents each one of the quantized time bins and the y-axis represents the probability difference between CDFs (FIG. 8).

At step 3, the violated portion of the group-averaged difference wave (i.e., positive values) may be identified (shaded area of FIG. 8).

At step 4, a RMI permutation test (e.g., Miller's test of the Race model) may be used to determine whether there is a statistically significant violation of the RMI over the positive values identified. In various embodiments, the data may be organized in one text file where the first column is named "Obs" for Observer (e.g., participant ID), the second column is named "Cond" for stimulus condition (V, S, or VS) and the third column is named "RT" for actual RT or "Inf" if set to infinity. In various embodiments, time bins that are to be tested (based on the positive time bins identified) may be identified. In various embodiments, the RMI permutation test may be performed by calling up the appropriate script.

In various embodiments, the results may provide a $t_{max}$ value, 95% criterion, and p-value which may be used in determining whether a significant violation of the Race Model exists across the entire study sample.

Figure 9A:
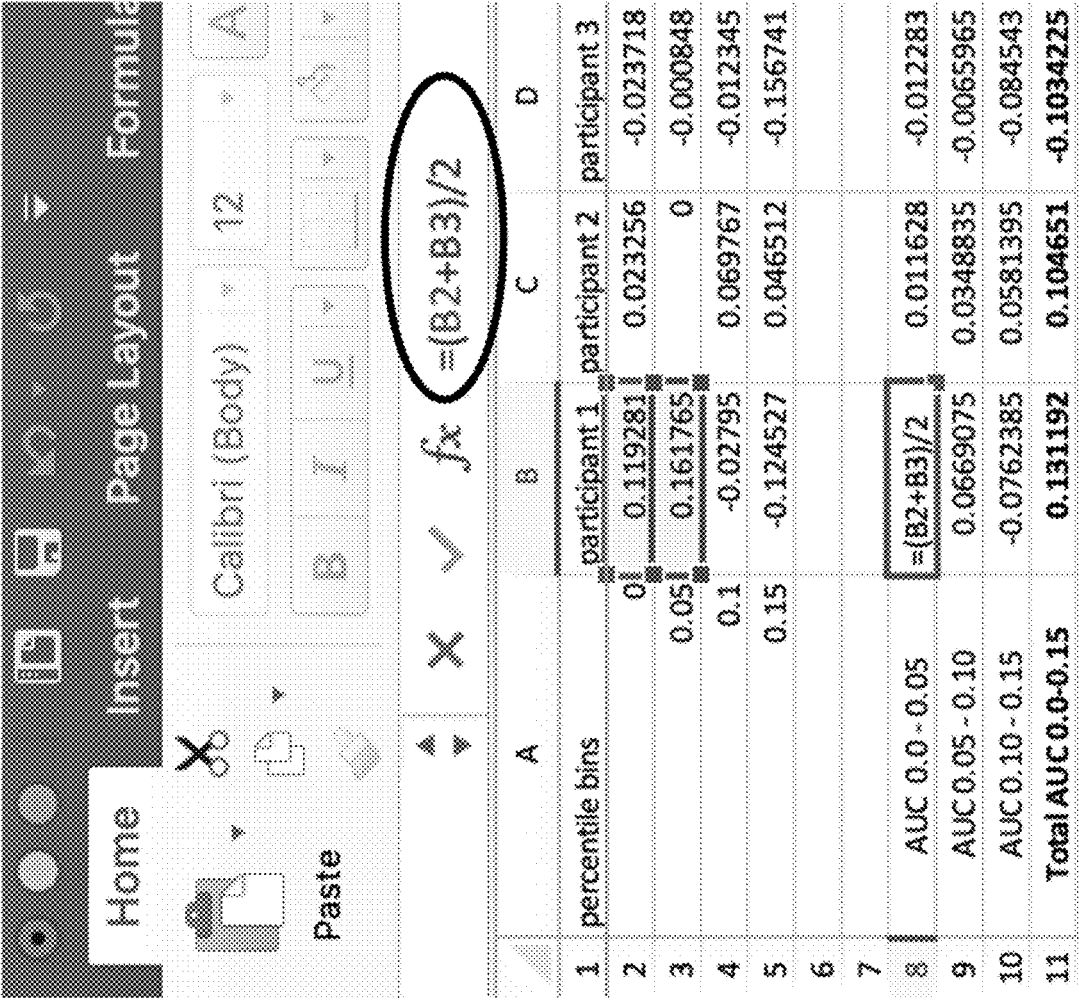
Figure 9C:
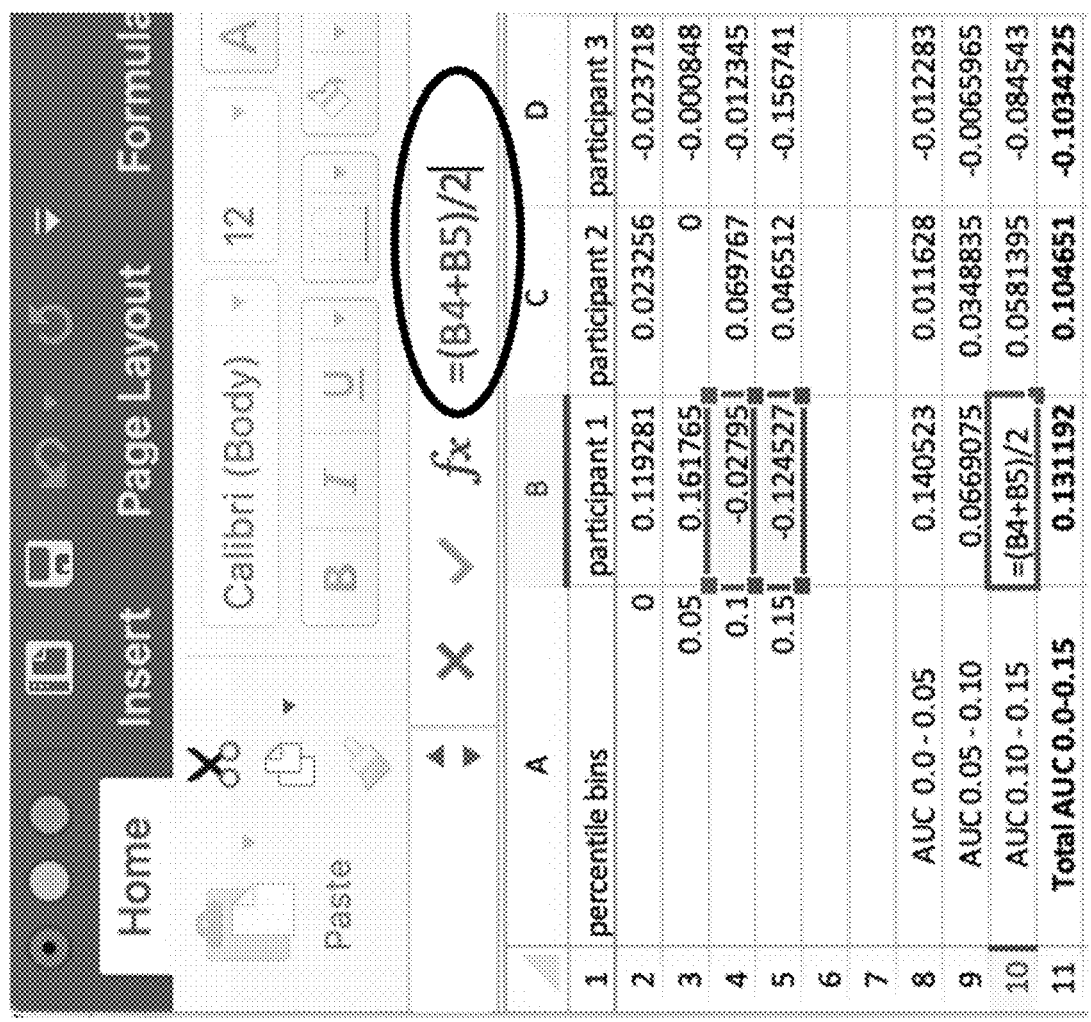
Figure 9D:
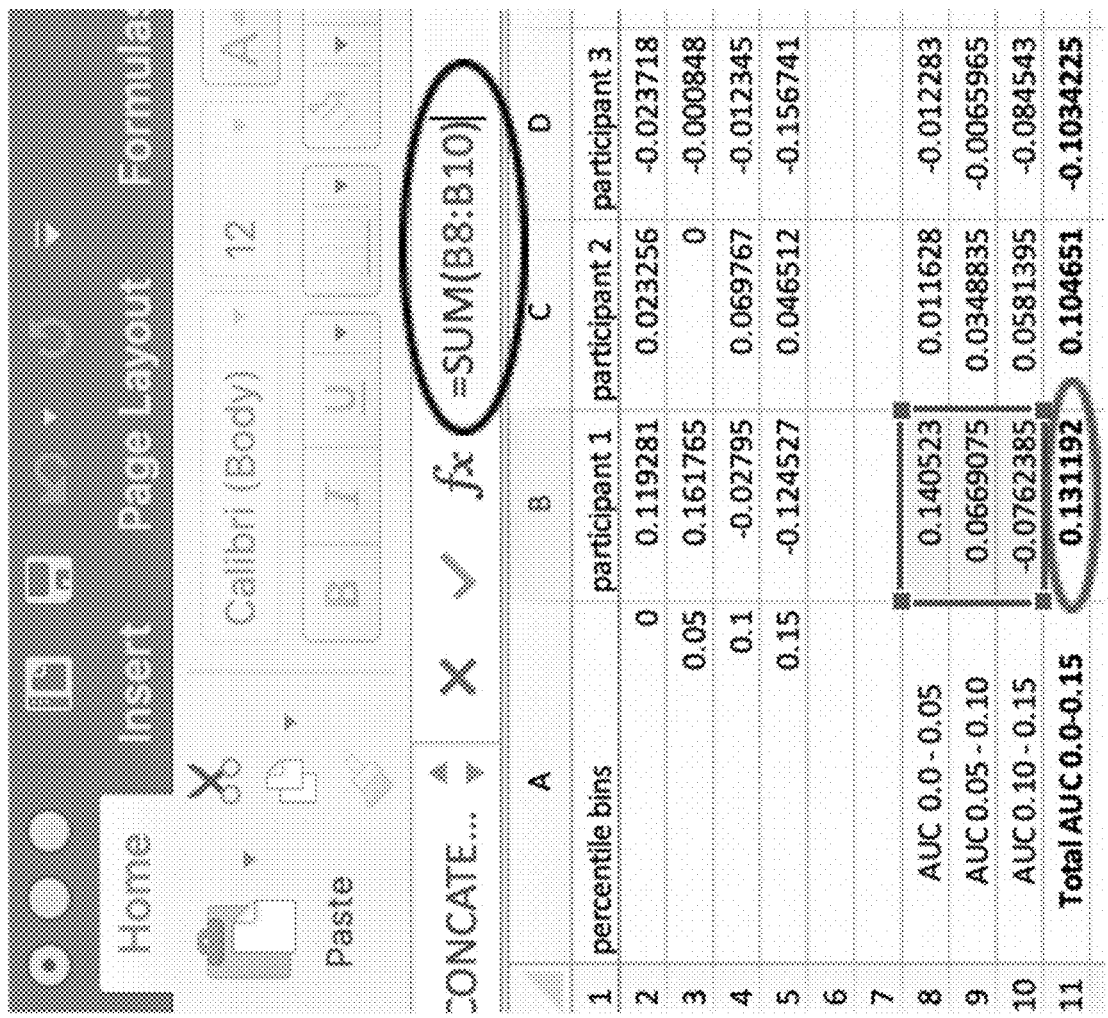

At step 5, the area-under-the-curve (AUC) may be calculated for each individual after establishing the significantly violated percentile bins. In various embodiments, AUC may serve as the magnitude of multisensory integration (or the independent variable). In various embodiments, the CDF difference value at time bin 1 (1st time positive value) may be summed with the CDF difference value of time bin 2 (next positive value) and then divided by two, as shown in FIG. 9A. In various embodiments, this may be repeated for each consecutive pair of time bins containing positive values, as shown in FIGS. 9B-9C. In various embodiments, the results may be summed to generate the total AUC of the CDF difference wave during the violated percentile range (e.g., 0.00-0.15 in FIG. 9D). In various embodiments, AUC may be a continuous measure and one AUC value is present for each individual for the violated portion of the RMI (e.g., FIG. 8d shows participant 1's AUC=0.13). In various embodiments, AUC can be used as an independent variable representing 'magnitude of VS integration' which can later be tested to predict important clinical outcome measures.

Figure 10:
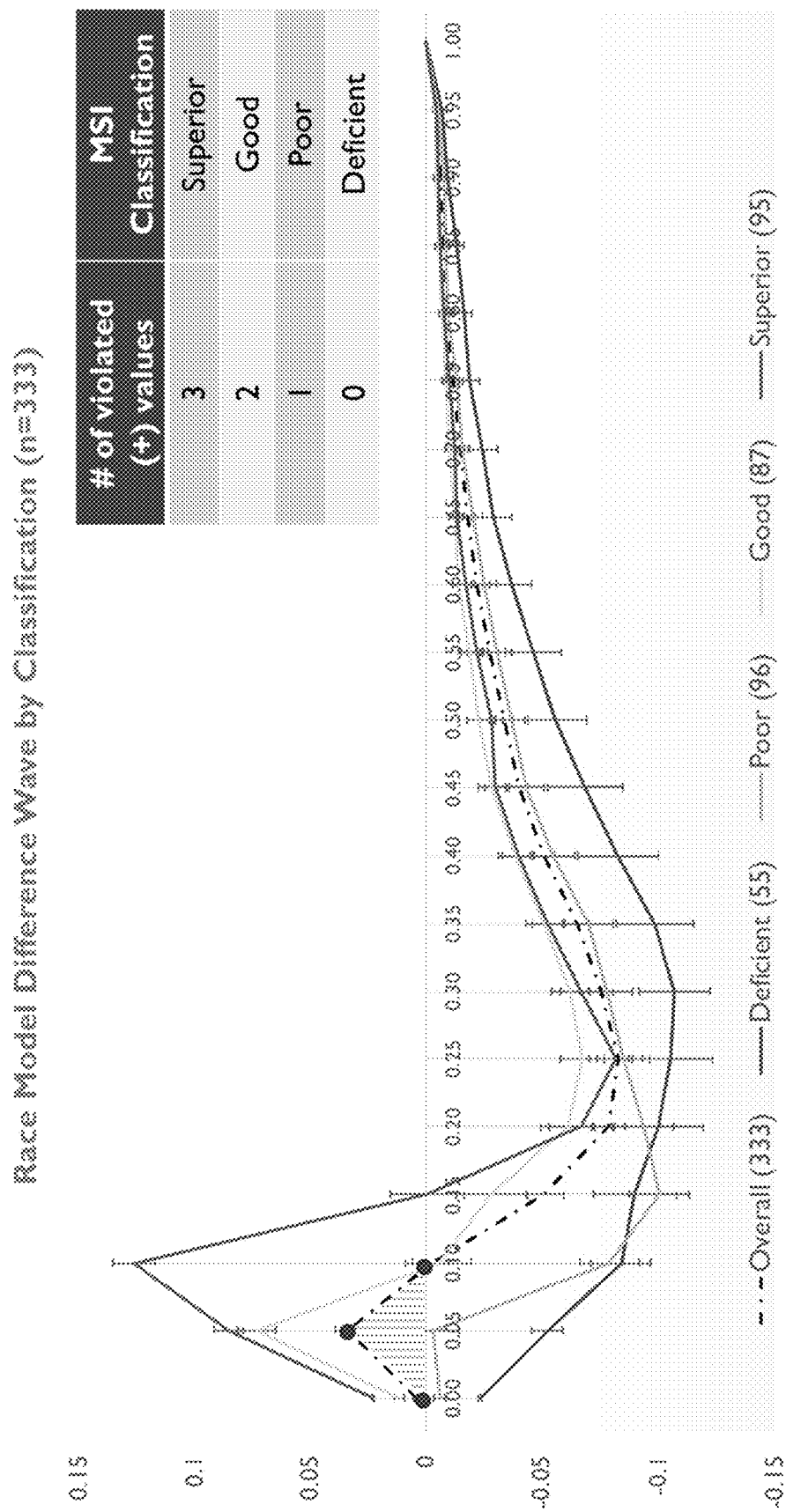
FIG. 10 illustrates an exemplary graph showing overall performance and group classification performance according to embodiments of the present disclosure.

At step 6, multisensory integration classification groups may be assigned based on the number of violated percentile bins (values greater than zero highlighted in gray in Table 3) during the violated percentile range identified above. For example, looking at Table 3 (percentile bins 0.00-0.15), Participant 1 has positive values for 2 out of 4 bins; Participant 2 has positive values for 4 out of 4 bins; and Participant 3 has positive values for 0 out of 4 bins. In various embodiments, a classification system may be generated based on the number of violated percentile bins (values greater than zero for 0, 1, 2, or 3 bins) during the 0-10th percentile. In various embodiments, FIG. 10 depicts one potential classification definition.

In various embodiments, a classification system may be implemented based on the number of violated percentile bins (where values greater than zero) during the group-averaged RMI violation period, as a means of depicting inherent differential integration patterns. In various embodiments, classification of data in this manner may reveal a clear degradation of race model violation by multisensory integration classification group.

FIG. 1 illustrates a system 100 for testing of multisensory integration effects of a user according to embodiments of the present disclosure. In FIG. 1, the system 100 includes a computer 102 (which may or may not include a computer display), one or more stimulator boxes 104a, 104b, a target 106 towards which the user will focus their attention, and a response sensor 108. In various embodiments, the response sensor 108 may be a foot pedal. The user 101 may be seated at the computer 102 and instructed to hold the stimulator boxes 104a, 104b with one or both hands. In various embodiments, the user may be provided audio isolation equipment to better focus the user's attention. In various embodiments, the audio isolation equipment may include headphones. In various embodiments, the response sensor may be located under the right foot or the left foot. In various embodiments, the user may be instructed to respond to unisensory and multisensory stimuli as quickly as possible by tapping the response sensor 108. In accordance with an aspect of the present disclosure, the system can be configured for use in a mobile (e.g., non-laboratory) environment. For example, the components disclosed in FIG. 1 can be adapted for implementation on a mobile device (e.g. laptop, tablet, smartphone, PDA, etc.) to extend the benefits of the present disclosure to the portions of the population which are unable to visit a clinical laboratory setting (e.g. elderly, persons exhibiting Parkinson's or Alzheimer's symptoms, or other clinical pathologies). For purposes of illustration and not limitation, such mobile applications of the present disclosure can provide the stimulators described in reference to FIG. 1 in a first region of the mobile device, and the response sensor in a second region of the mobile device. In various embodiments, the mobile device may detect a response when the user performs an action other than touching the touch screen. For example, the mobile device may detect a response when the user blinks one or both eyes by analyzing video frames with a camera (e.g., integrated camera). In another example, the mobile device may detect a response when the user shakes or inverts the mobile device through, e.g., an accelerometer.

Each stimulator box 104a, 104b includes a first signaling modality 110 and a second signaling modality 112. In various embodiments, the first signaling modality 110 includes a light (e.g., LED) that may be turned on (i.e., illuminated) and/or off. In various embodiments, the second signaling modality 112 includes a tactile stimulus (e.g., a vibration motor). In various embodiments, in order to signal to the user, one or more of the stimulator boxes 104a, 104b may use only the first signaling modality 110 and the system 100 may record a response time for the user to touch the response sensor 108 in response to the first signaling modality 110 (e.g., when the LED turns on).

In various embodiments, in order to signal to the user, one or more of the stimulator boxes 104a, 104b may use only the second signaling modality 112 and the system 100 may record a response time for the user to touch the response sensor 108 in response to the second signaling modality 112 (e.g., when the vibration motor vibrates). In various embodiments, in order to signal to the user, one or more of the stimulator boxes 104a, 104b may use both the first signaling modality 110 and the second signaling modality 112. In this example, the system 100 may record a response time for the user to touch the response sensor 108 in response to the first signaling modality 110 (e.g., when the LED turns on) and second signaling modality 112 (e.g., when the vibration motor vibrates) signaling simultaneously.

In various embodiments, the first and second signaling modalities 110, 112 may operate independently. For example, the first signaling modality 110 and the second signaling modality 112 may alternate back and forth to signal to the user (e.g., light, vibrate, light, vibrate). In various embodiments, the first and second signaling modalities 110, 112 may operate randomly. For example, the first signaling modality 110 and the second signaling modality 112 may randomly signal to the user (e.g., vibrate, light, light, light, vibrate). In various embodiments, the time between two stimuli (either multisensory and/or unisensory) can be varied. In various embodiments, the time between two stimuli is randomized. In various embodiments, each of the unisensory and/or multisensory stimuli may be presented to the user randomly (e.g., varying the type of sensory stimulus presented to the user). In various embodiments, one multisensory stimulus may be intermixed with a different multisensory stimulus. In various embodiments, multisensory stimuli may be intermixed with unisensory stimuli. In various embodiments one unisensory stimulus may be intermixed with a different unisensory stimulus.

In various embodiments, the system 100 may wait for a predetermined time limit (e.g., 2000 ms) for a user to respond to the signaling modality 104a, 104b. In various embodiments, if the user 101 fails to respond within the predetermined time limit, a default value may be assigned to the user's response time. In various embodiments, the default value may be a value of infinity (INF). In various embodiments, the default value may be the predetermined time limit.

FIG. 2A illustrates an exemplary mobile device 200 for testing of multisensory integration effects of a user according to embodiments of the present disclosure. As shown in FIG. 2A, the mobile device 200 includes a display 202 having a target 206, a response region 208, and one or more visual signals 210. In various embodiments, the mobile device 200 may signal to the user via somatosensory signals 212 using the internal vibration motor housed within the mobile device 200. In various embodiments, the mobile device 200 may signal to the user via auditory signals 214 using the integrated speaker(s) within the mobile device 200. When the user receives one or more of the signals 210, 212, and/or 214, the user may press the response region 208 as quickly as possible so that the mobile device 200 can record a response time between when the one or more signals were provided and when the user pressed the response region 208.

FIGS. 2B-2L illustrate exemplary screens of a mobile device for testing of multisensory integration effects of a user according to embodiments of the present disclosure.

FIGS. 3A-3C illustrate a spreadsheet for calculating the frequency of a response time (RT) occurring within a specified range of RTs for each experimental condition according to embodiments of the present disclosure. In various embodiments, frequency of an RT occurring within a specified range of RTs for each experimental condition. a) Visual (V); b) Somatosensory (S); and c) Visual-Somatosensory (VS) may be computed.

FIG. 4 illustrates a spreadsheet according to embodiments of the present disclosure. In various embodiments, the cumulative distribution frequency for the experimental conditions may be generated by the summation of the cumulative probability at the 95 percentile bin for the Soma (S) condition.

Figure 5A:
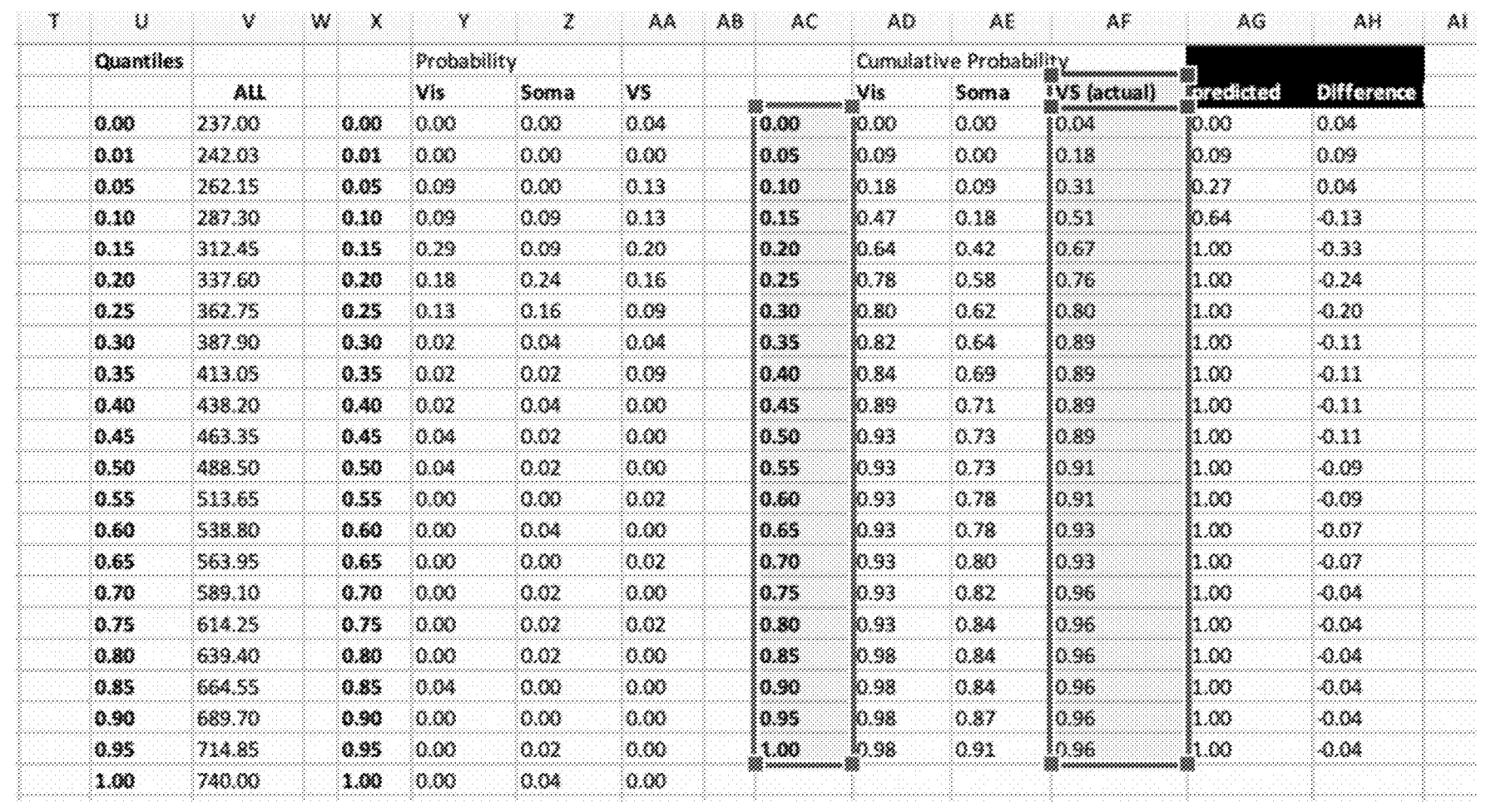
Figure 5B:
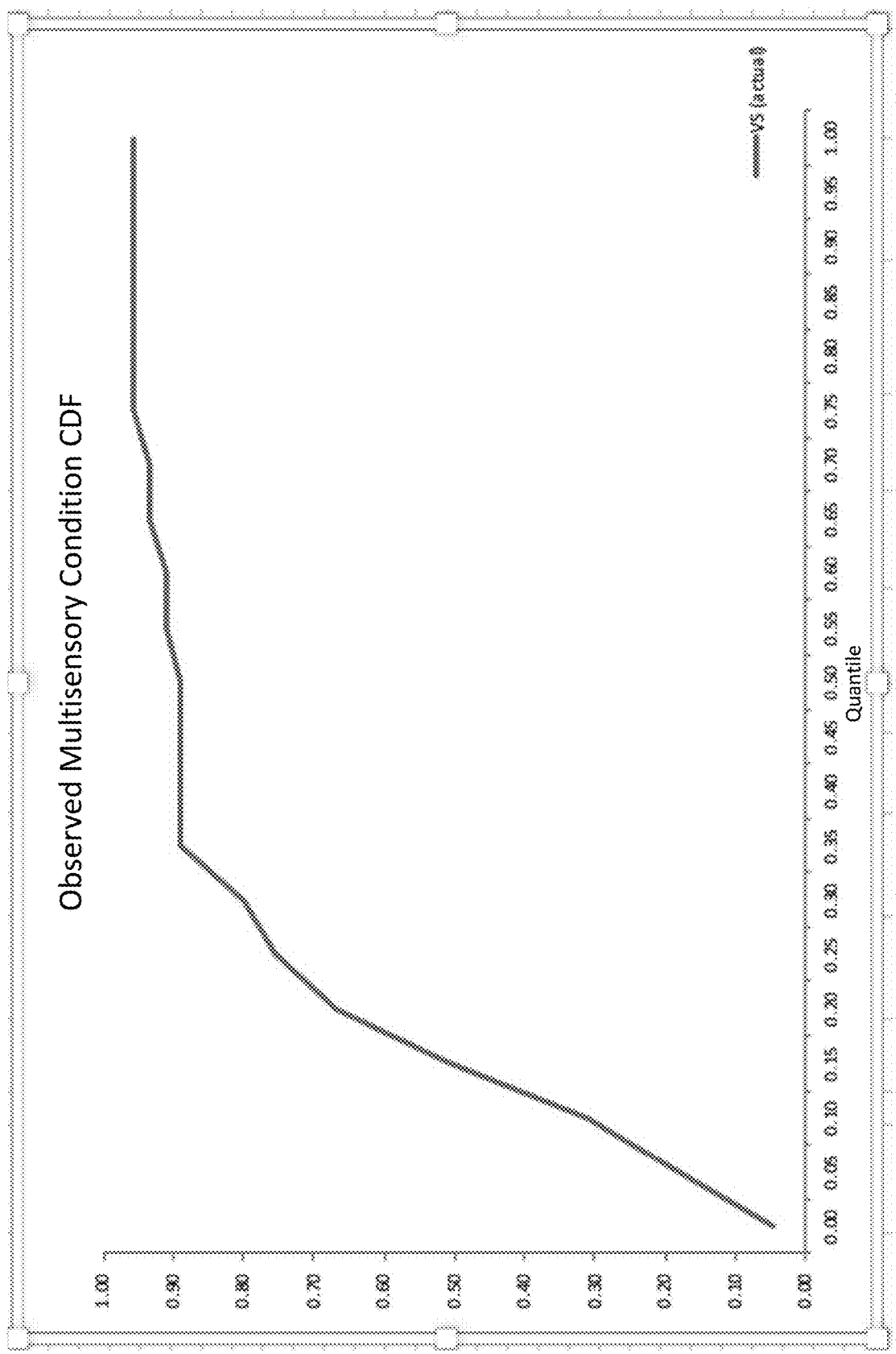
FIG. 5B illustrates a graph of the observed cumulative distribution function (CDF) as a function of quantile according to embodiments of the present disclosure.
Figure 6A:
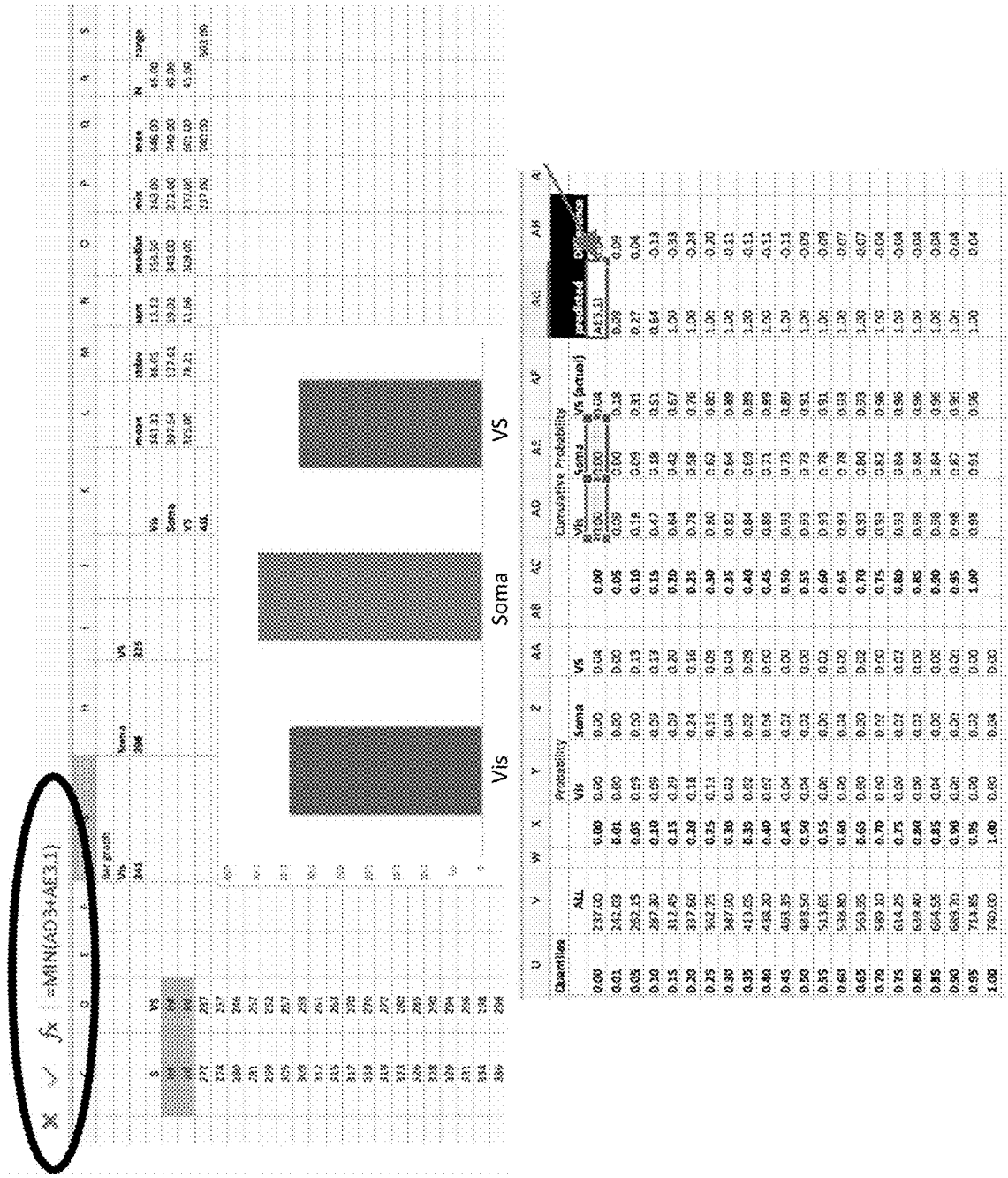
FIGS. 6A-6B illustrate an exemplary calculation of the predicted CDF according to embodiments of the present disclosure.
Figure 6B:
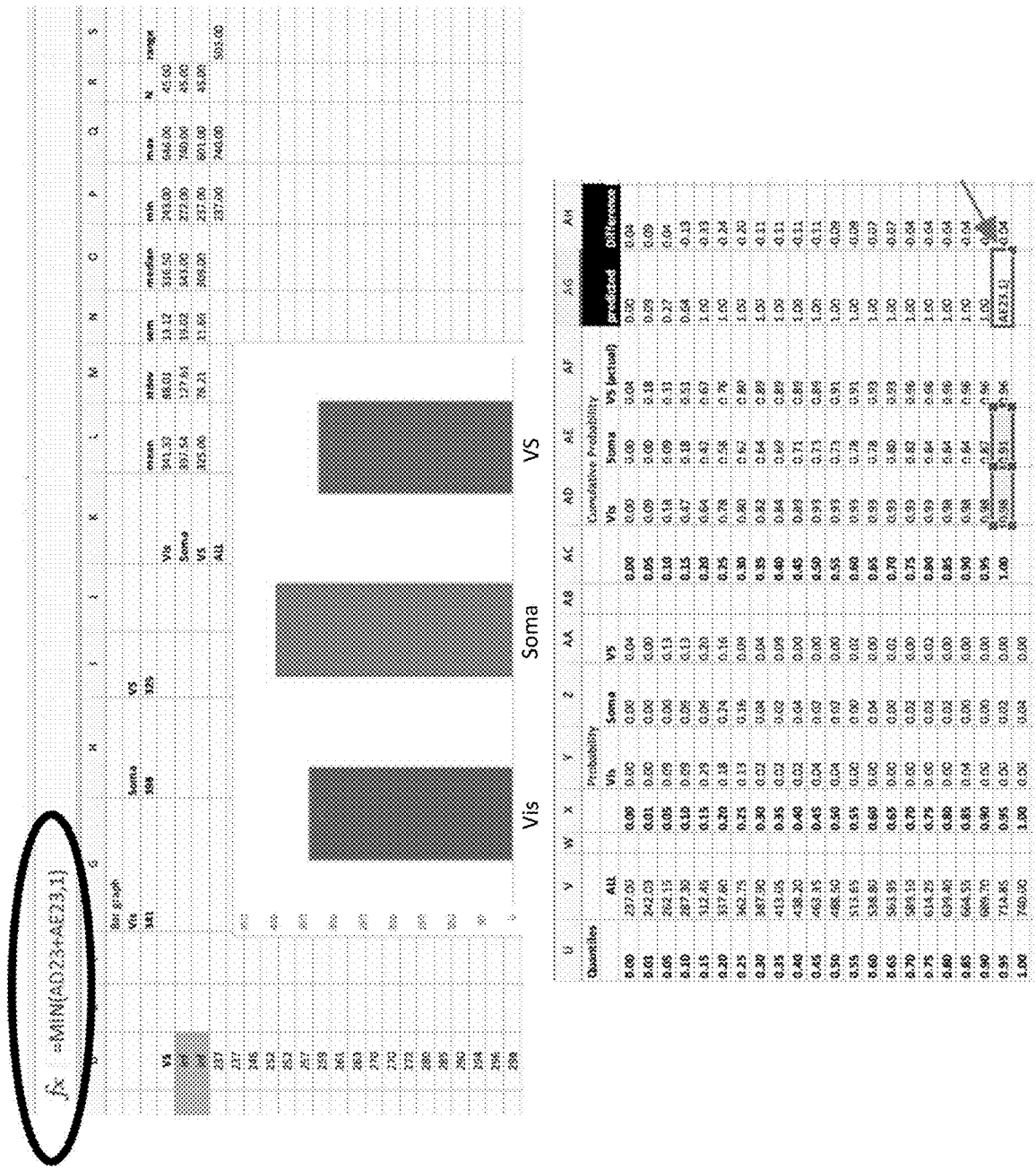

FIG. 5A illustrates a spreadsheet for a cumulative probability distribution of the observed (i.e., actual) multisensory condition according to embodiments of the present disclosure. FIG. 5B illustrates a graph of the observed cumulative distribution function (CDF) as a function of quantile according to embodiments of the present disclosure. In various embodiments, the observed CDF (VS condition) is plotted as a function of quantile.

FIGS. 6A-6B illustrate a spreadsheet for calculating the predicted CDF according to embodiments of the present disclosure. In various embodiments, the predicted CDF may be calculated by summing the CDFs of the two unisensory (i.e., only visual and only somatosensory) CDFs while including an upper limit=1 for each of the quantiles from 0.00 to 1.00.

Figure 7B:
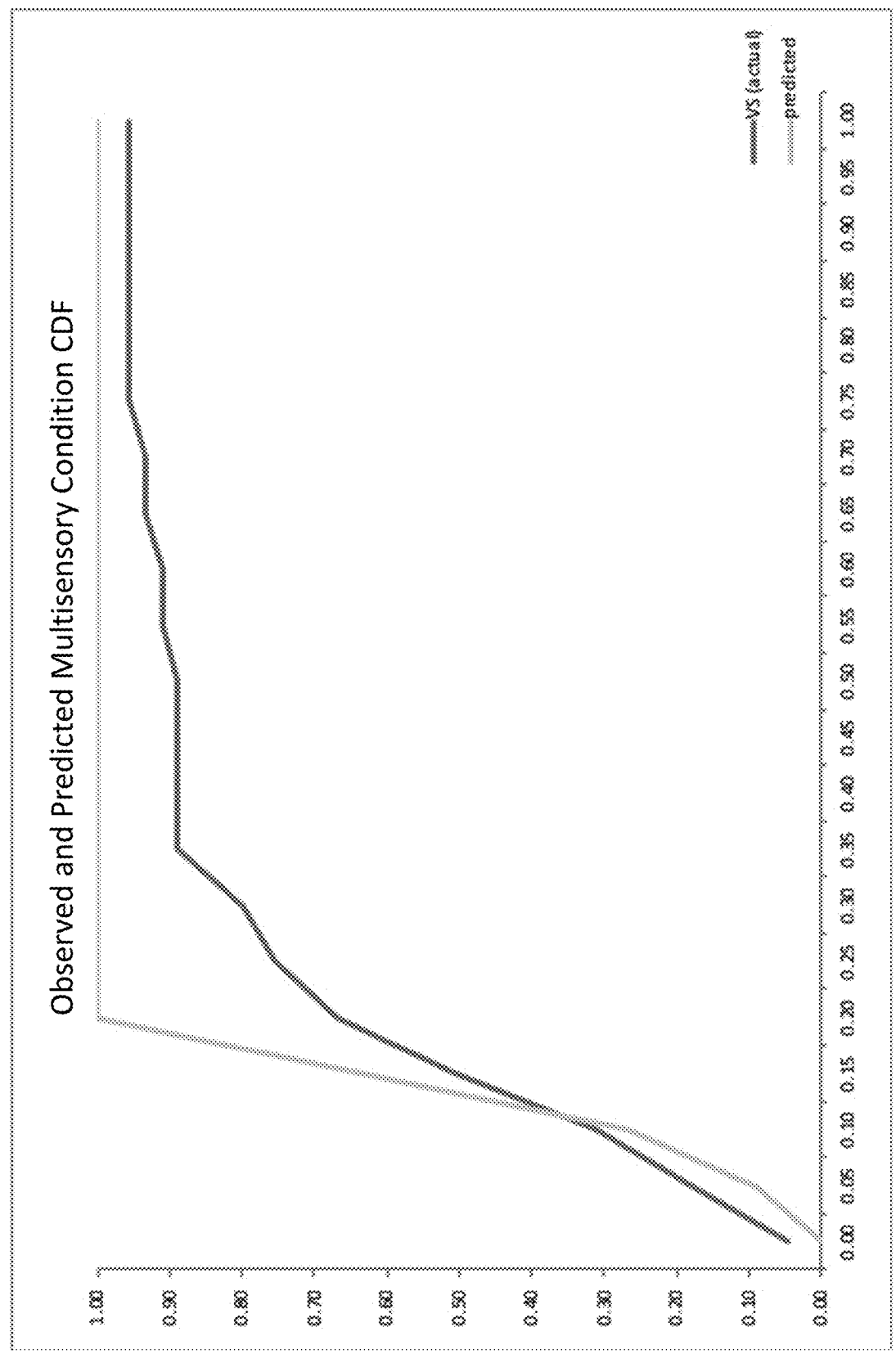
FIG. 7B illustrates a graph of the observed and predicted CDF functions according to embodiments of the present disclosure.
Figure 7D:
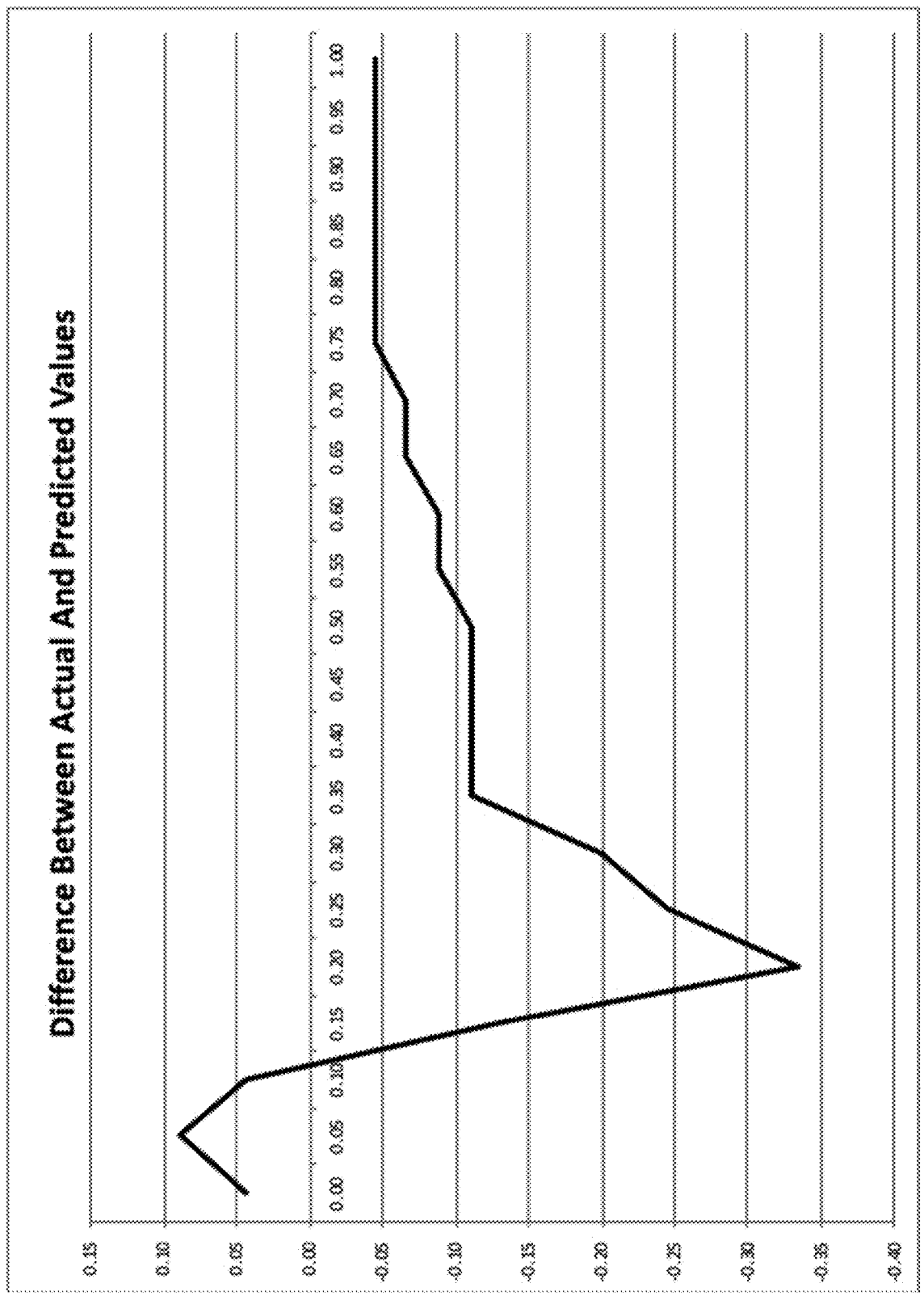
FIG. 7D illustrates a graph of the difference between the observed and predicted CDF functions according to embodiments of the present disclosure.

FIG. 7A illustrates a spreadsheet for generating a difference curve according to embodiments of the present disclosure. FIG. 7B illustrates a graph of the observed and predicted CDF functions according to embodiments of the present disclosure. FIG. 7C illustrates a spreadsheet of data for generating the graph of FIG. 7D according to embodiments of the present disclosure. FIG. 7D illustrates a graph of the difference between the observed and predicted CDF functions according to embodiments of the present disclosure. In various embodiments, the Race Model Inequality (RMI) may be calculated by subtracting the CDF of the predicted CDF from the actual CDF for each quantile.

FIG. 8 illustrates an area under the curve (shaded/highlighted area) for the graph of the difference that is indicative of multisensory integration according to embodiments of the present disclosure. In various embodiments, the individual RMI values may be plotted to generate a differential curve. In various embodiments, the x-axis represents each of the 21 quantiles (column AC) and the y-axis represents the probability difference between predicted and observed CDFs (column AH). In various embodiments, the shaded portion of the RMI depicts the positive or violated portion of the waveform, indicative of multisensory integration. In various embodiments, the shaded portion may comprise at least the first quantile. In various embodiments, the shaded portion may comprise at least the first two quantiles. In various embodiments, the shaded portion may comprise at least the first three quantiles. In various embodiments, the shaded portion may comprise the first six quantiles. In various embodiments, the shaded portion may comprise all quantiles. In various embodiments, the shaded portion may not comprise all quantiles. In various embodiments, the shaded portion may comprise quantiles two through five. In various embodiments, the shaded portion may comprise quantiles three and four. One of skill in the art will recognize that any suitable quantiles may be used for determining whether multisensory integration was observed.

FIGS. 9A-9D illustrate calculating an individual's area under the curve according to embodiments of the present disclosure. In various embodiments, at step (a.) an individual's Area-Under-the-Curve (AUC) may be calculated. In various embodiments, the sum of the CDF difference value at quantile 1 (0.00) with the CDF difference value of quantile 2 (0.05) may be divide by two to create a measure of AUC from 0.00-0.05. In various embodiments, step a) may be repeated for each consecutive pair of quantiles (e.g., 0.05-0.10 and 0.10-0.15) to attain the AUC for each quantile range. In various embodiments, the AUC for each time bin range may be summed to obtain the total AUC for the entire time bin window. In various embodiments, a quantile range of (0.00-0.05) may be used. In various embodiments, a wider quantile range (0.00-0.15) may be used to this calculation.

FIG. 10 illustrates a graph showing overall performance and group classification performance according to embodiments of the present disclosure. In various embodiments, the Race Model Inequality may be plotted for all participants ("overall") and/or by group classification (e.g., deficient, poor, good, and superior). In various embodiments, the group classification may be based on how many violated quantiles the particular user (or group of users) has. Violated quantiles occur when the observed response time for the multisensory stimulus (e.g., both visual and somatosensory) is faster than the predicted response time for each individual sensory stimulus. For example, the "superior" group had response times that were faster than the predicted response time for three quantiles (e.g., 0.00-0.05, 0.05-0.10, and 0.10-0.15). In another example, the "good" group had response times that were faster than the predicted response time for two quantiles (0.00-0.05 and 0.05-0.10). In another example, the "poor" group had response times that were faster than the predicted response time for only one quantile (e.g., 0.00-0.05). Lastly, the "deficient" group had no response times that were faster than any predicted response time.

In various embodiments, if a patient has zero or only one violated quantile (i.e., the difference between the observed and predicted is positive for at most one quantile), the patient may be classified as having deficient or poor multisensory integration abilities.

The group-averaged difference ("overall") between actual and predicted CDFs over the trajectory of all quantiles is represented by the dashed trace in FIG. 10. The solid traces represent each of the four multisensory integration classifications defined above based on the number of violated quantile bins.

Representative Results

FIG. 10 illustrates a group-averaged violation (dashed trace) occurring over the 0-10% percentile range for a sample of 333 older adults. Here, the total number of positive values (0, 1, 2, or 3) for those 3 quantiles (0.00-0.10) determines which multisensory classification group a person is assigned (deficient, poor, good, or superior) respectively. As illustrated in FIG. 10, group-averaged results demonstrate a significant race model violation over the fastest tenth of all response times. While this group-averaged difference waveform suggests that on average older adults demonstrate significant race model violation (i.e., multisensory integration effects), this may not be a one size fits all model. Rather, the individual's AUC under the violated time period (0-10% ile) provides a better proxy for assessing the individual's magnitude of VS integration, as differential integration patterns have been documented. Once calculated, the individual magnitude of VS integration can serve as a continuous predictor of important outcomes in various clinical populations, including but not limited to measures of cognition and/or mobility.

Discussion

In various embodiments, the present disclosure describes systems, methods, and computer program products used to quantify multisensory integration effects. In various embodiments, the systems, methods, and computer program products described herein can be utilized to predict important cognitive and motor outcomes relying on similar neural circuitry (e.g., Alzheimer's, Parkinson's, other neurodegenerative or pathological diseases, etc.). In various embodiments, the present disclosure describes a step-by-step process for calculating the magnitude of multisensory integration in an effort to facilitate innovative and novel clinical translational multisensory studies across diverse clinical populations and age-ranges.

In various embodiments, preserving an individual user's RT dataset may be important. In various embodiments, data trimming procedures that omit very slow RTs may be avoided given the inherent bias on the RT distribution. In various embodiments, omitted and slow RTs may be set to infinity (INF). In various embodiments, not setting omitted and slow RTs to infinity may lead to the development of inaccurate multisensory integration results. In various embodiments, race model significance testing may be tested over group-averaged violated portions of the RMI identified in the study cohort (i.e., not a priori specified windows).

In various embodiments, the systems, methods, and computer program products of the present disclosure may be used in documenting robust MSI effects in diverse populations (e.g., an aging population). In various embodiments, implementation of various experimental adaptations (e.g., different bi- and even tri-sensory combinations, varied stimulus presentation onset times, and differential magnitude of stimulus intensity) may provide incremental information regarding this multisensory phenomenon (see also FIG. 11).

In various embodiments, the above approach may demonstrate significant associations between the magnitude of multisensory (e.g., visual-somatosensory) integration with balance and incident falls, where older adults with greater multisensory integration abilities manifest better balance performance, less history of falls, and/or less incident falls. In various embodiments, the magnitude of visual-somatosensory integration may be a strong predictor of spatial aspects of gait, where individuals with worse visual-somatosensory integration demonstrated slower gait speed, shorter strides, and increased double support. In various embodiments, this methodology may be used to uncover the relationship of MSI with other important clinical outcomes like cognitive status, and aid in the identification of critical functional and structural multisensory integrative neural networks including but not limited to healthy aging and/or clinical populations like Alzheimer's and Parkinson's.

Figure 13:
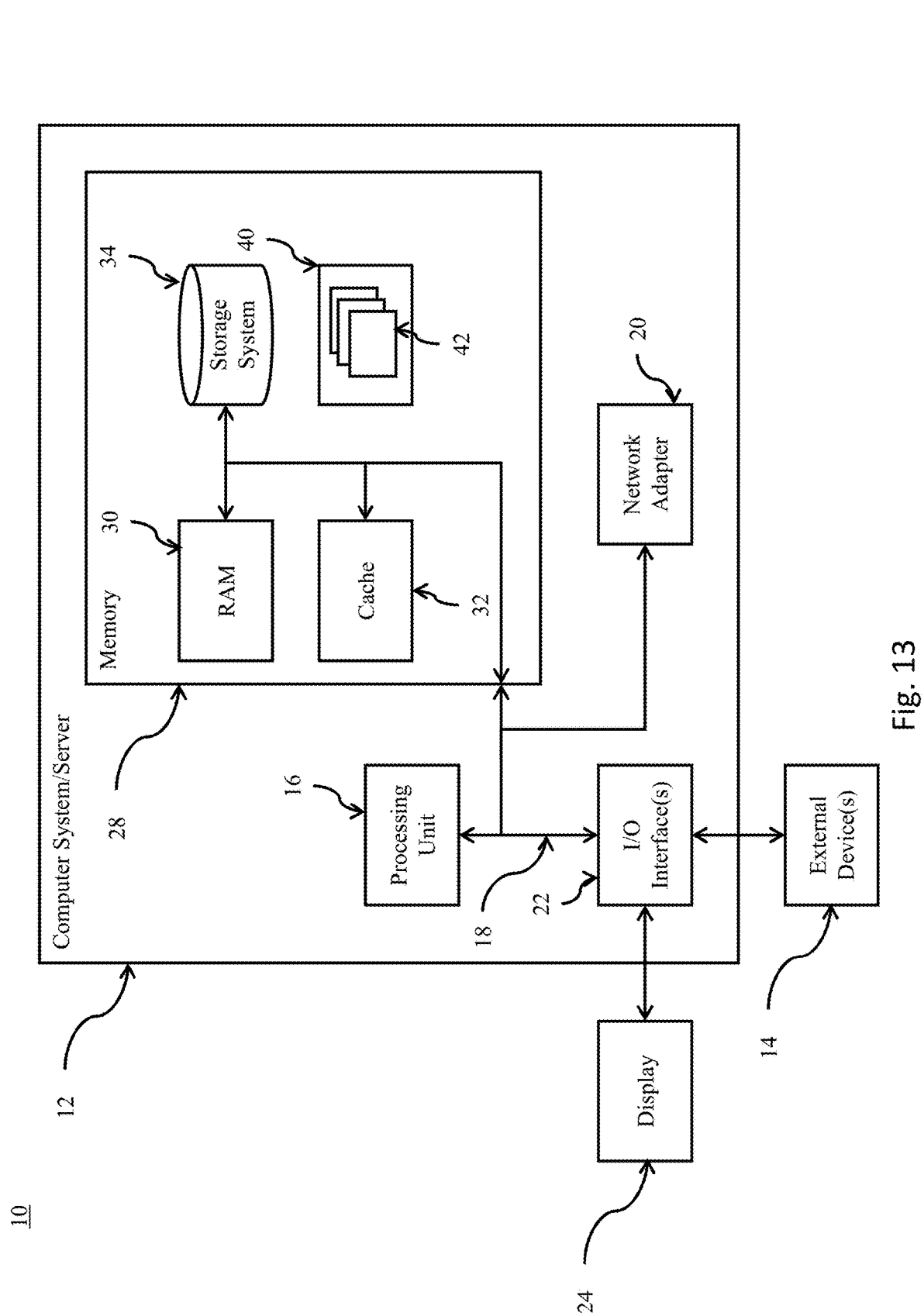
FIG. 13 depicts an exemplary computing node according to embodiments of the present disclosure.

With reference to FIG. 13, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for testing of multi sensory integration of a user, the system comprising:
   a device comprising a plurality of user-signaling modalities selected from the group consisting of visual, somatosensory, and auditory modalitis, wherein each of the the plurality user-signaling modalities is a different user-signaling modality from the remaining plurality of user-signaling modalities, a user response sensor, and a computing node comprising a computer readable storage medium having program instructions embodied therewith, the program instructions executable by a processor of the computing node to cause the processor to perform a method comprising:
   providing a first plurality of signals to the user from one of the plurality of user-signaling modalities;
   providing a second plurality of signals to the user from another of the plurality of user-signaling modalities;
   providing a third plurality of signals to the user from a simultaneous combination of at least two of the plurality of user-signaling modalities to test multisensory integration of the user;
   receiving, at the user response sensor, indications from the user in response to each of the first plurality of signals, the second plurality of signals, and the third plurality of signals;
   determining user response times between providing each of the first, second, and third plurality of signals and the respective indications;
   generating an observed curve based on the determined user response times;
   determining a differential curve from the observed curve and a predicted curve;
   determining an area under at least a portion of the differential curve;
   when the area is above a predetermined threshold, providing an indication that the user has satisfactory integrated sensory information; and
   when the area is below the predetermined threshold, providing an indication that the user has unsatisfactory integrated sensory information.

2. The system of claim 1, wherein at least one of the plurality of user-signaling modalities comprises at least one somatosensory stimulus.

3. The system of claim 2, wherein the at least one somatosensory stimulus comprises a vibration mechanism.

4. The system of claim 3, wherein the first or second plurality of signals comprises vibration of the vibration mechanism.

5. The system of claim 1, wherein at least one of the plurality of user-signaling modalities comprises a visual stimulus.

6. The system of claim 5, wherein at least one of the plurality of user-signaling modalities comprises one or more lights.

7. The system of claim 6, wherein the first or second plurality of signals comprises illumination of the one or more lights.

8. The system of claim 1, wherein at least one of the first plurality of signals and at least one of the second plurality of signals are provided sequentially.

9. The system of claim 1, wherein generating the observed curve comprises binning the user response times into a plurality of quantiles.

10. The system of claim 9, wherein each of the plurality of quantiles comprises five percent of a range of user response times.

11. The system of claim 10, wherein the range of user response times comprises a difference between a maximum of the user response times and a minimum of the user response times.

12. The system of claim 10, wherein the portion of the differential curve comprises at least a first one of the plurality of quantiles.

13. The system of claim 10, wherein the portion of the differential curve comprises at least a first two of the plurality of quantiles.

14. The system of claim 10, wherein the portion of the differential curve comprises at least a first three of the plurality of quantiles.

15. The system of claim 1, wherein the predicted curve is determined from the determined user response times to at least one of the first plurality of signals or the second plurality of signals.

16. The system of claim 1, wherein the observed curve is determined from the determined user response times to the third plurality of signals.

17. The system of claim 1, wherein the differential curve is determined by subtracting the predicted curve from the observed curve.

18. A method for testing of multi sensory integration of a user, the method comprising:
- providing a device comprising a plurality of user-signaling modalities selected from the group consisting of: visual, somatosensory, and auditory modalities, wherein each of the plurality of user-signaling modalities is a different user-signaling modality from the remaining plurality of user-signaling modalities, and a user response sensor;
- providing a first plurality of signals to the user from one of the plurality of user-signaling modalities;
- providing a second plurality of signals to the user from another of the plurality of user-signaling modalities;
- providing a third plurality of signals to the user from a simultaneous combination of at least two of the plurality of user-signaling modalities to test multisensory integration of the user;
- receiving, at the user response sensor, indications from the user in response to each of the first plurality of signals, the second plurality of signals, and the third plurality of signals;
- determining user response times between providing each of the first, second, and third plurality of signals and the respective indications;
- generating an observed curve based on the determined user response times;
- determining a differential curve from the observed curve and a predicted curve;
- determining an area under at least a portion of the differential curve;
- when the area is above a predetermined threshold, providing an indication that the user has satisfactory integrated sensory information; and
- when the area is below the predetermined threshold, providing an indication that the user has unsatisfactory integrated sensory information.

19. A computer program product for testing of multi sensory integration of a user, the computer program product comprising a computer readable storage medium having program instructions embodied therewith, the program instructions executable by a processor to cause the processor to perform a method comprising:
- providing a first plurality of signals to the user from one of a plurality of user-signaling modalities selected from the group consisting of: visual, somatosensory, and auditory modalities, wherein each of the plurality of user-signaling modalities is a different user-signaling modality from the remaining plurality of user-signaling modalities;
- providing a second plurality of signals to the user from another of the plurality of user-signaling modalities;
- providing a third plurality of signals to the user from a simultaneous combination of at least two of the plurality of user-signaling modalities to test multisensory integration of the user;
- receiving, at a user response sensor of a device, indications from the user in response to each of the first plurality of signals, the second plurality of signals and the third plurality of signals;
- determining user response times between providing each of the first, second, and third plurality of signals and the respective first indications;
- generating an observed curve based on the determined user response times;
- determining a differential curve from the observed curve and a predicted curve;
- determining an area under at least a portion of the differential curve;
- when the area is above a predetermined threshold, providing an indication that the user has satisfactory integrated sensory information; and
- when the area is below the predetermined threshold, providing an indication that the user has unsatisfactory integrated sensory information.

* * * * *